United States Patent
Ito et al.

(10) Patent No.: US 8,144,379 B2
(45) Date of Patent: Mar. 27, 2012

(54) RECORDING AND REPRODUCING DEVICE AND POLARIZATION DIRECTION CONTROLLING METHOD

(75) Inventors: Terumasa Ito, Tokyo (JP); Kenji Tanaka, Tokyo (JP); Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 12/562,660

(22) Filed: Sep. 18, 2009

(65) Prior Publication Data
US 2010/0091349 A1    Apr. 15, 2010

(30) Foreign Application Priority Data
Oct. 10, 2008   (JP) .................................. 2008-264170

(51) Int. Cl.
*G03H 1/02*    (2006.01)
(52) U.S. Cl. ....... 359/3; 359/489.07; 349/98; 369/112.1
(58) Field of Classification Search ......................... None
See application file for complete search history.

(56) References Cited

U.S. PATENT DOCUMENTS

| | | | |
|---|---|---|---|
| 2004/0027968 A1* | 2/2004 | Horimai | 369/112.19 |
| 2004/0165518 A1* | 8/2004 | Horimai et al. | 369/94 |
| 2008/0291807 A1 | 11/2008 | Itoh | |

FOREIGN PATENT DOCUMENTS

| | | |
|---|---|---|
| JP | 2004-265472 | 9/2004 |
| JP | 2006-154444 | 6/2006 |
| JP | 2007-101608 | 4/2007 |
| JP | 2007-102185 | 4/2007 |
| JP | 2007-200385 | 8/2007 |
| JP | 2007-200385 | 9/2007 |
| JP | 2008-107599 | 5/2008 |
| JP | 2008-152827 | 7/2008 |
| JP | 2009-230851 | 10/2009 |
| WO | WO 2005/109117 | 11/2005 |

* cited by examiner

*Primary Examiner* — Jennifer L. Doak
(74) *Attorney, Agent, or Firm* — Robert J. Depke; Rockey, Depke & Lyons, LLC

(57) ABSTRACT

Disclosed herein is a recording and reproducing device including: a light source; an intensity modulating section; a polarization beam splitter; a selective polarization direction controlling section; a linearly polarized light/circularly polarized light converting section; and a driving controlling section.

8 Claims, 22 Drawing Sheets

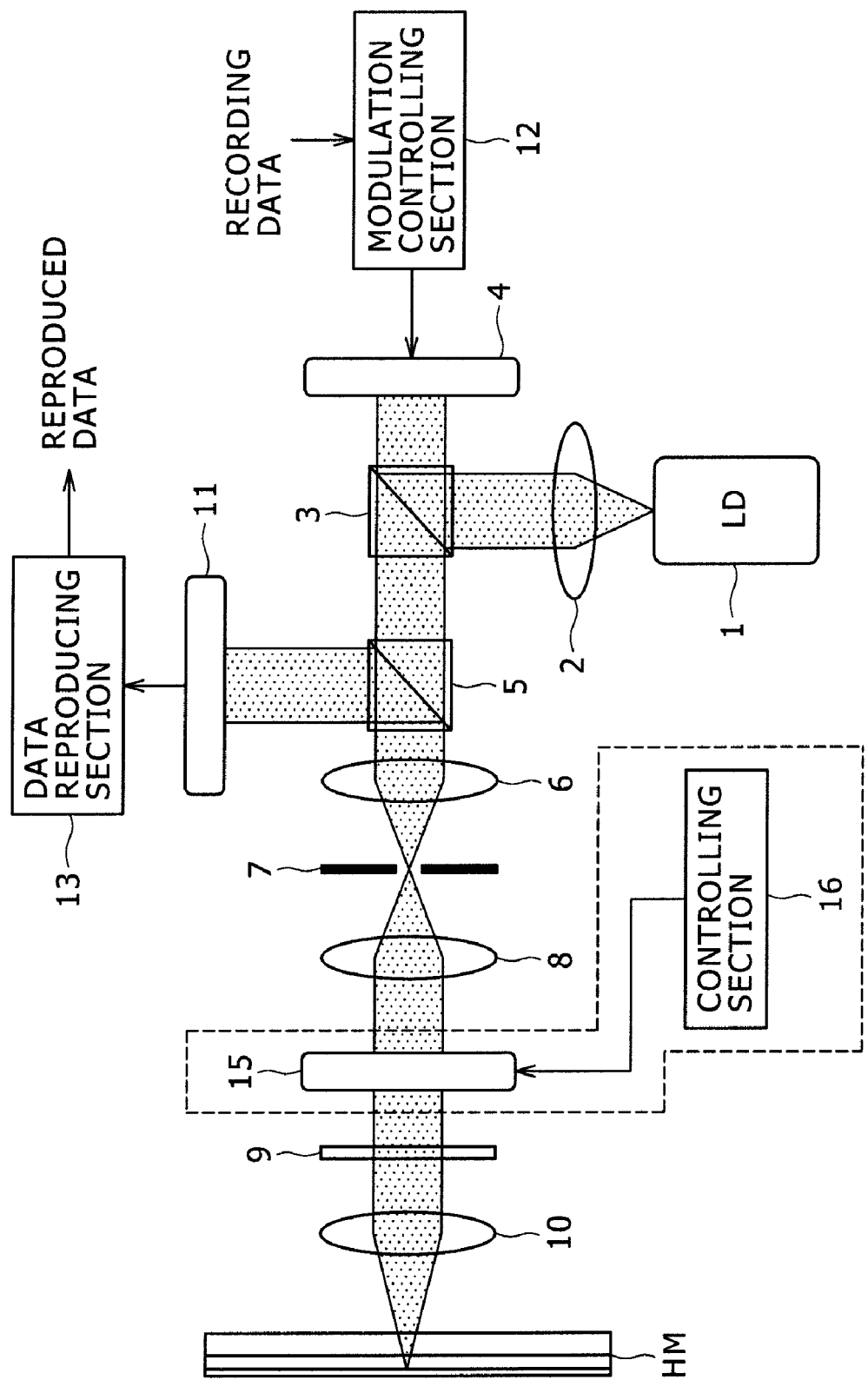

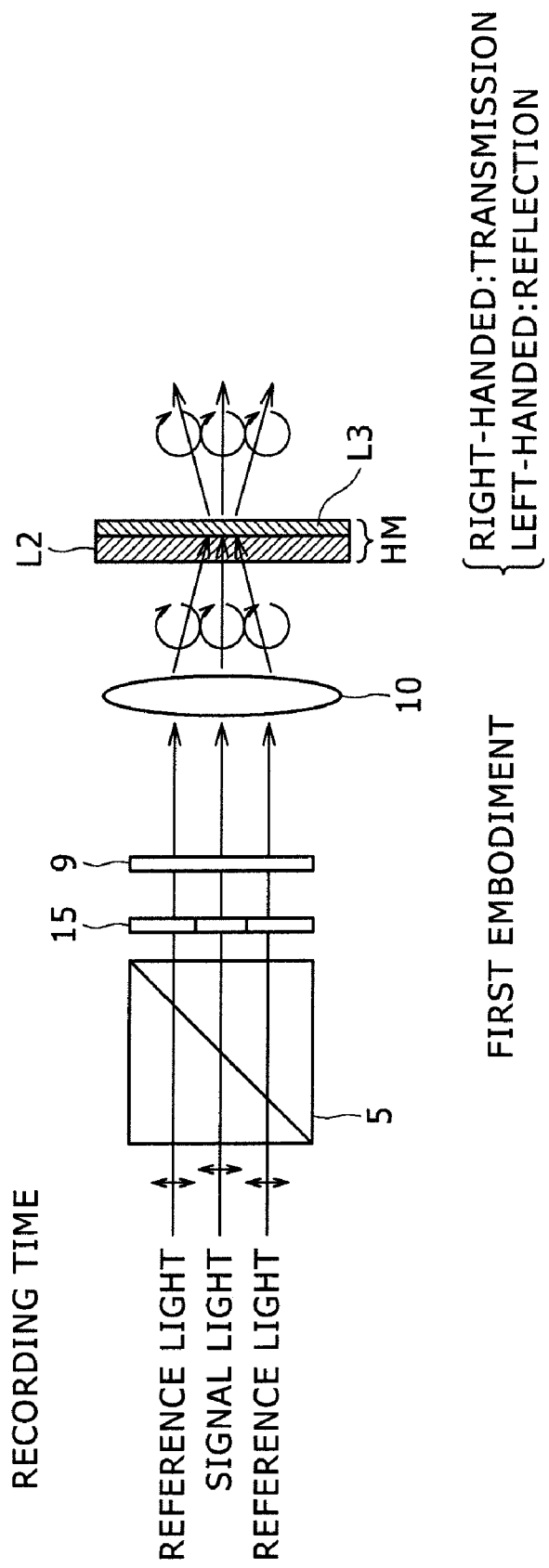

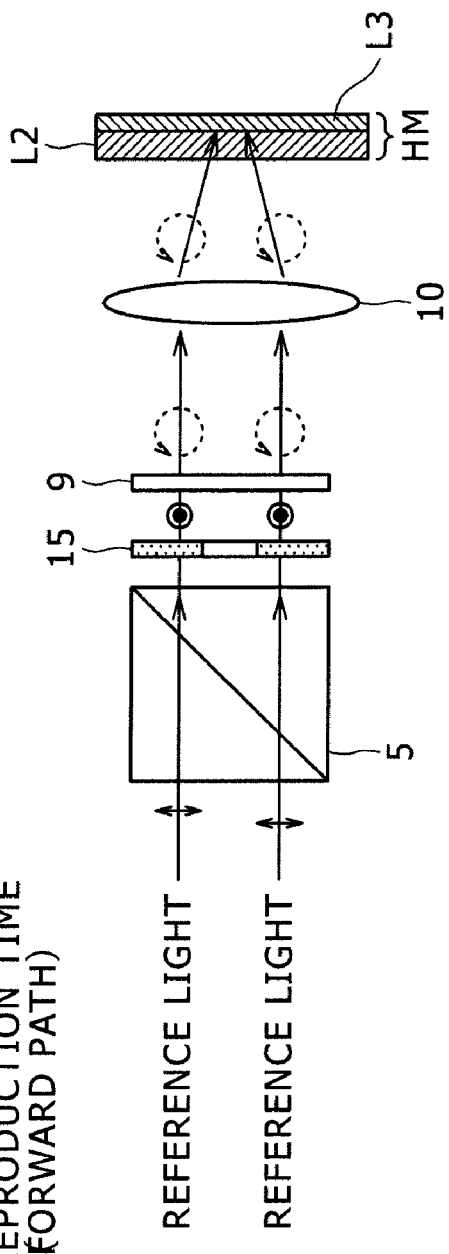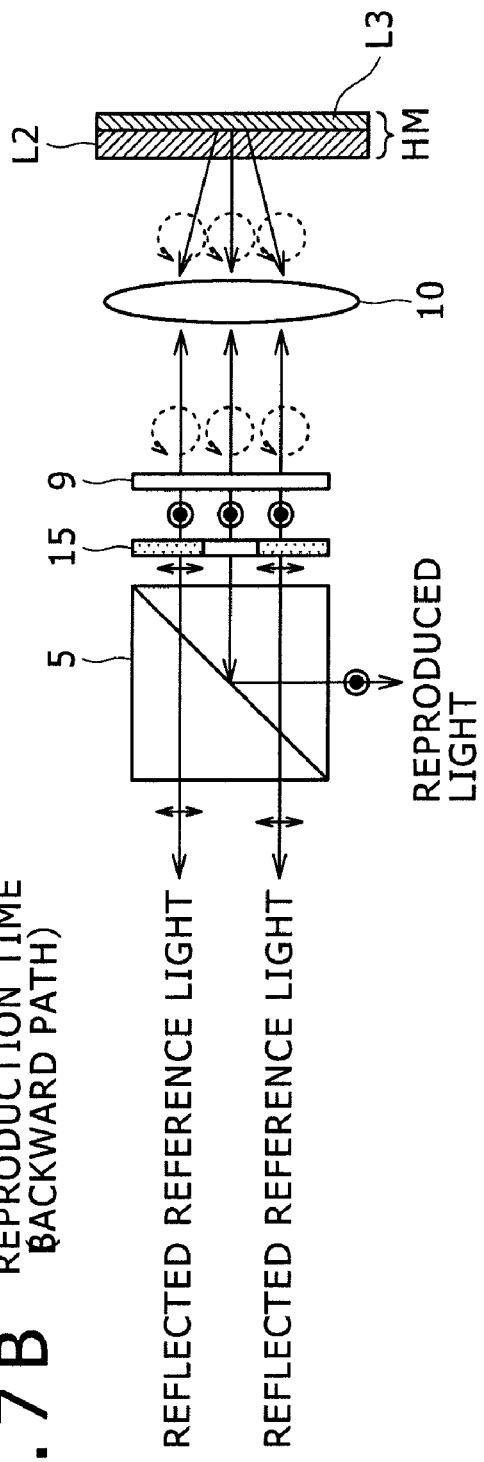

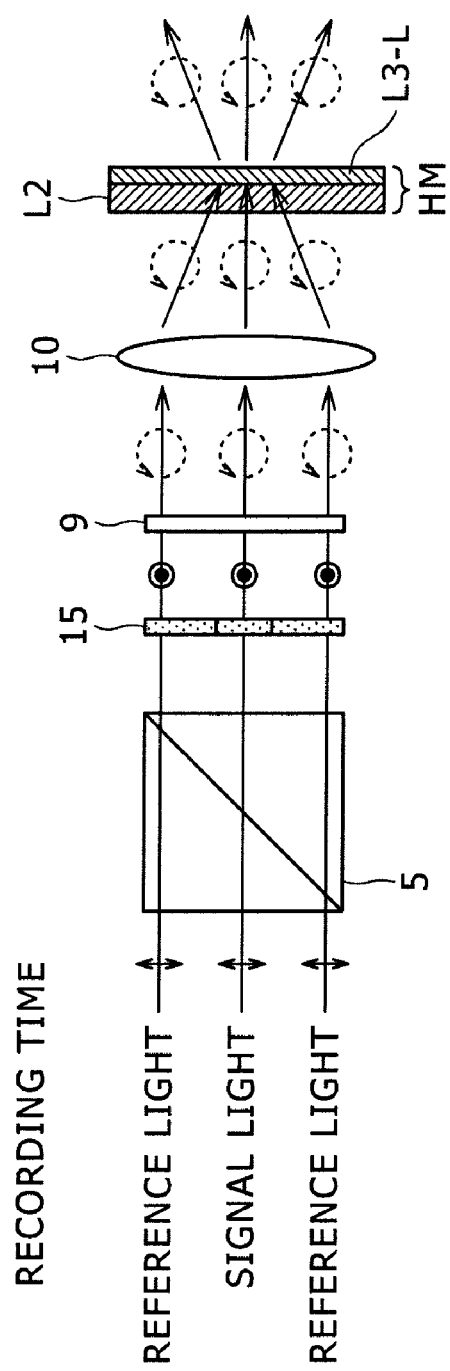

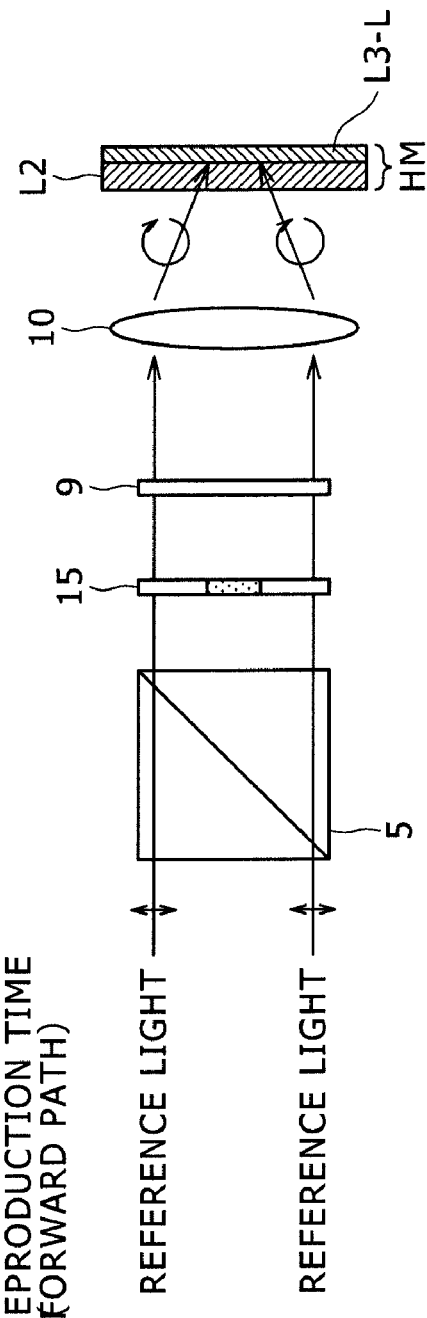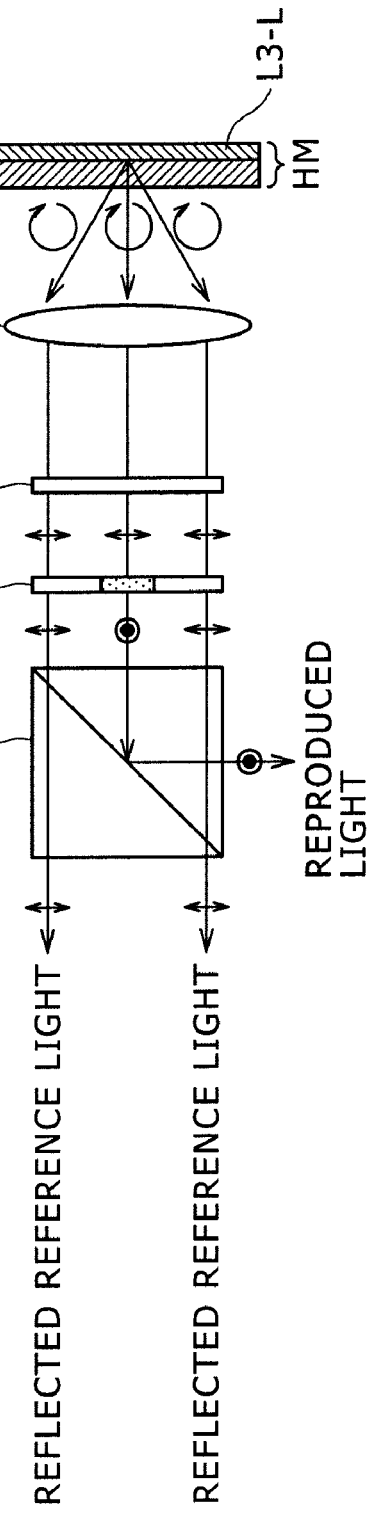

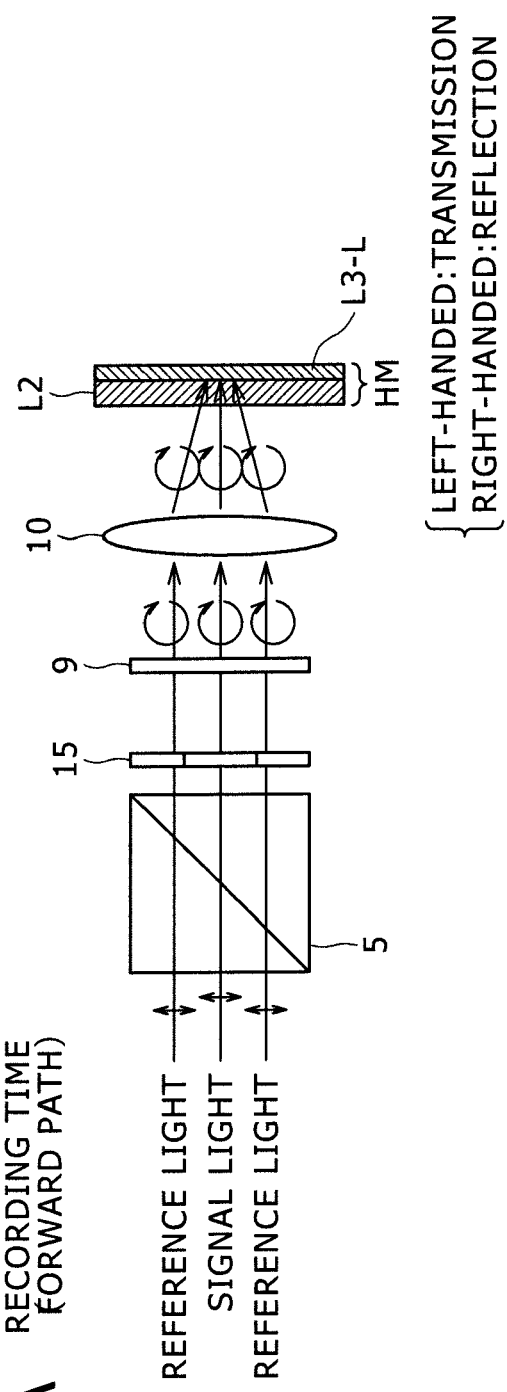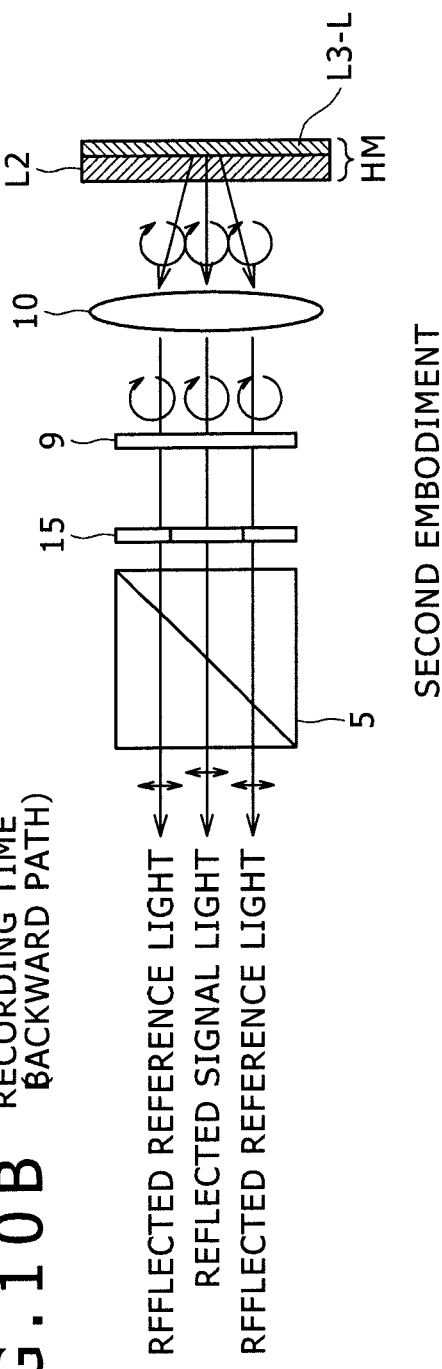

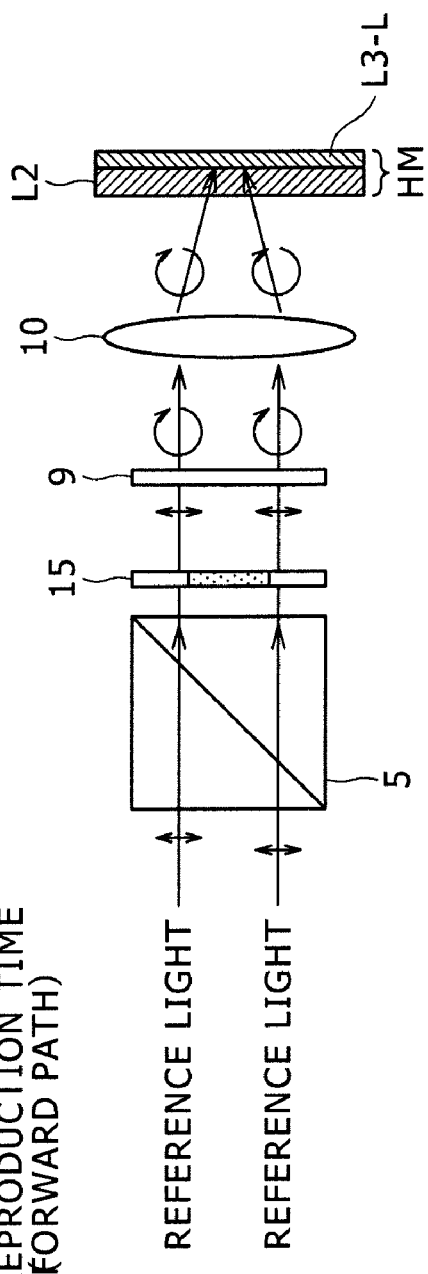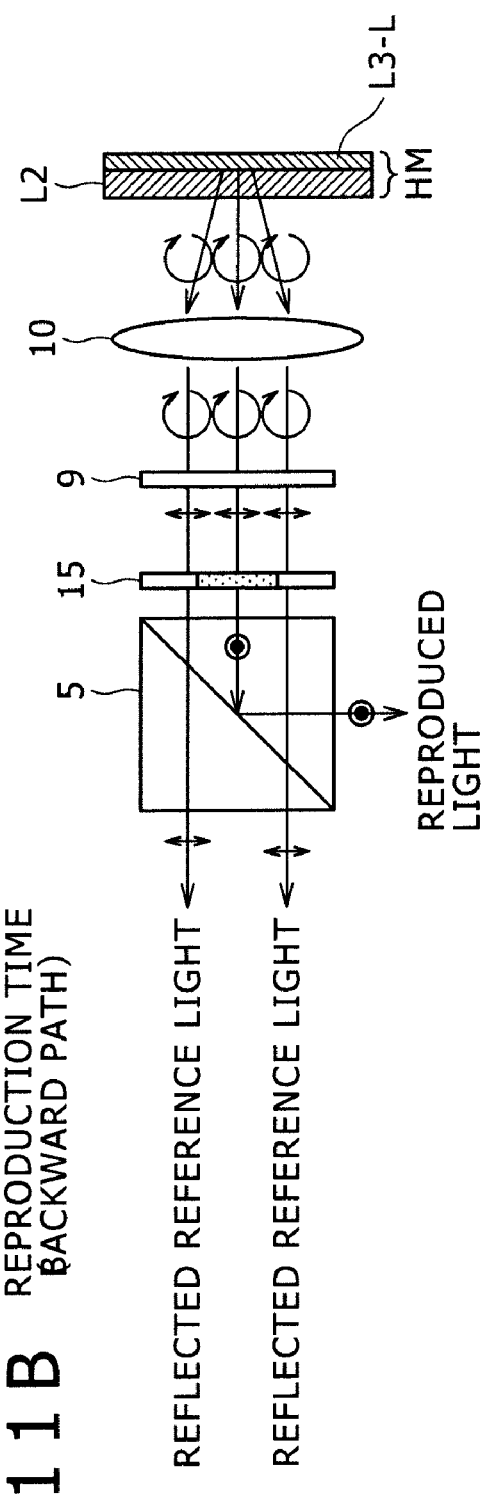

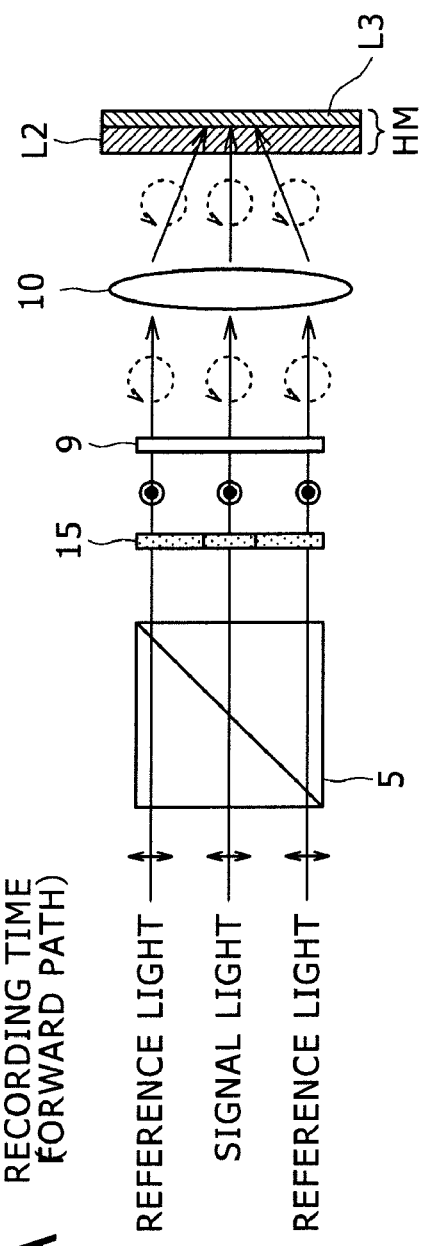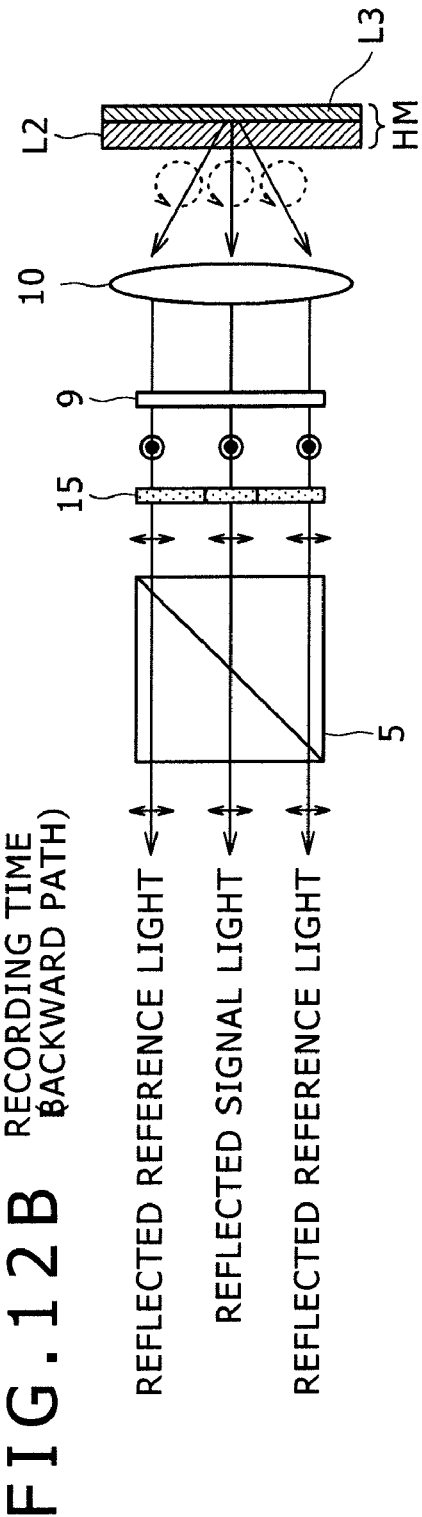

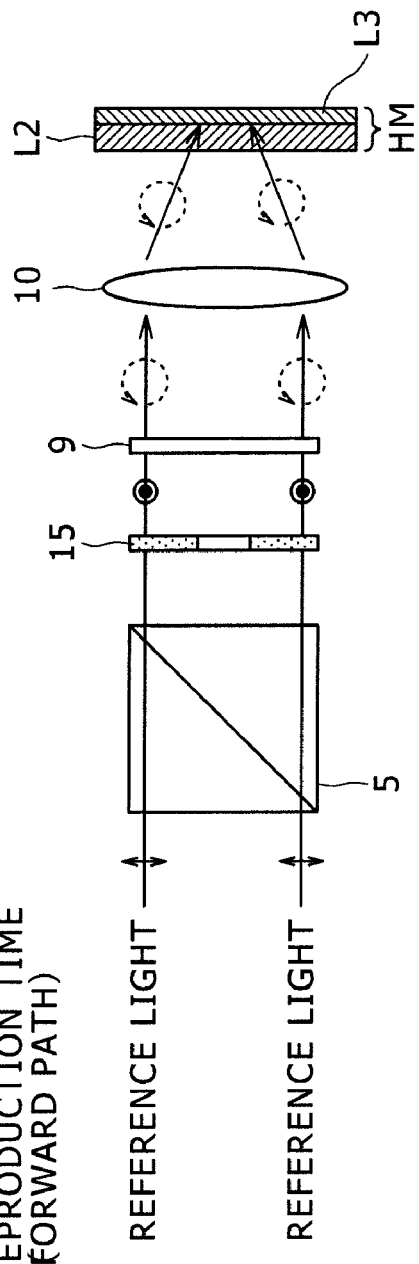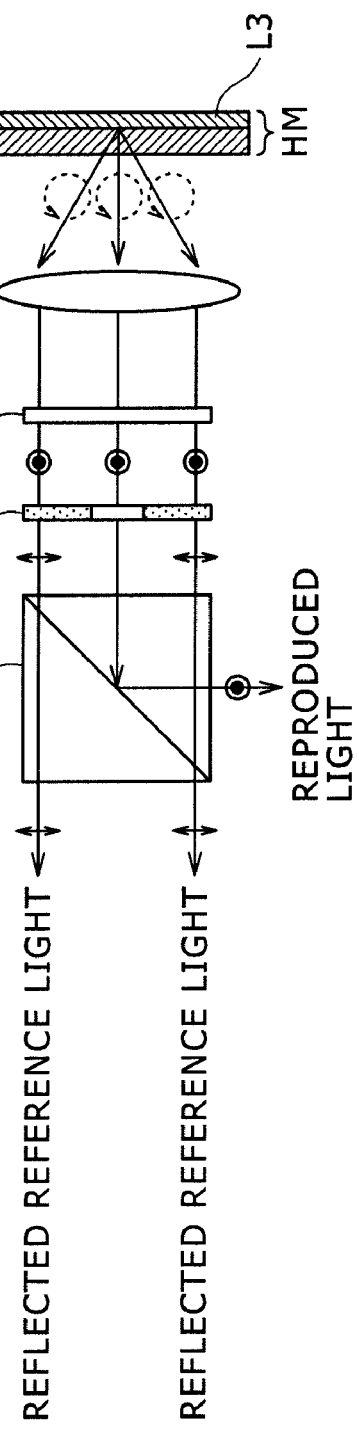

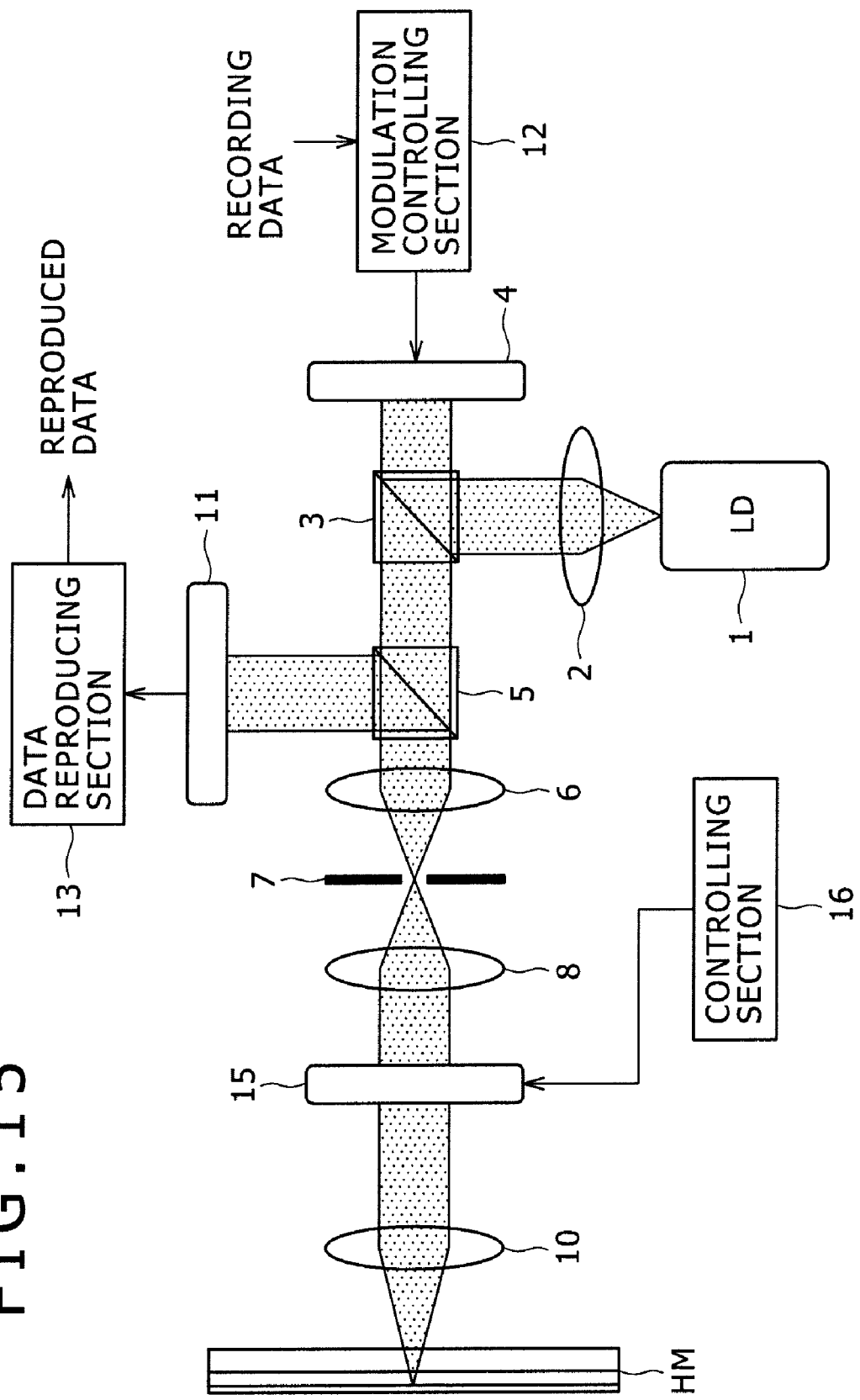

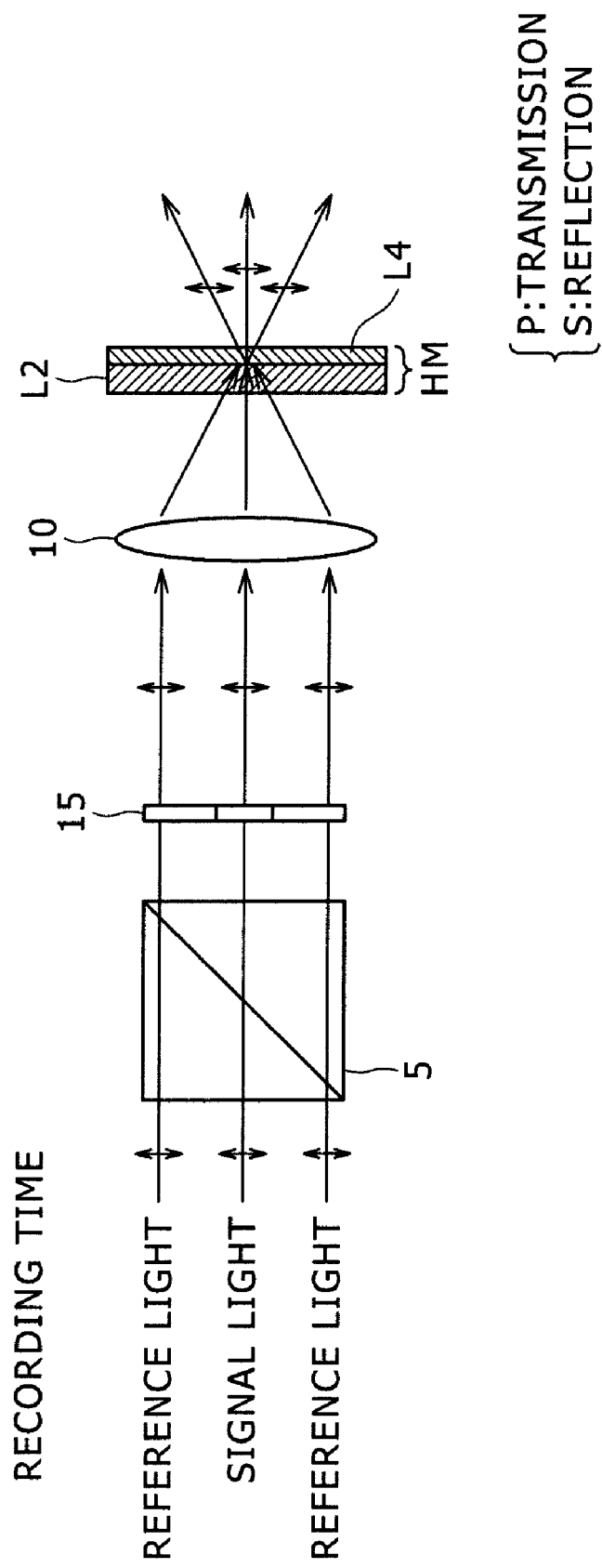

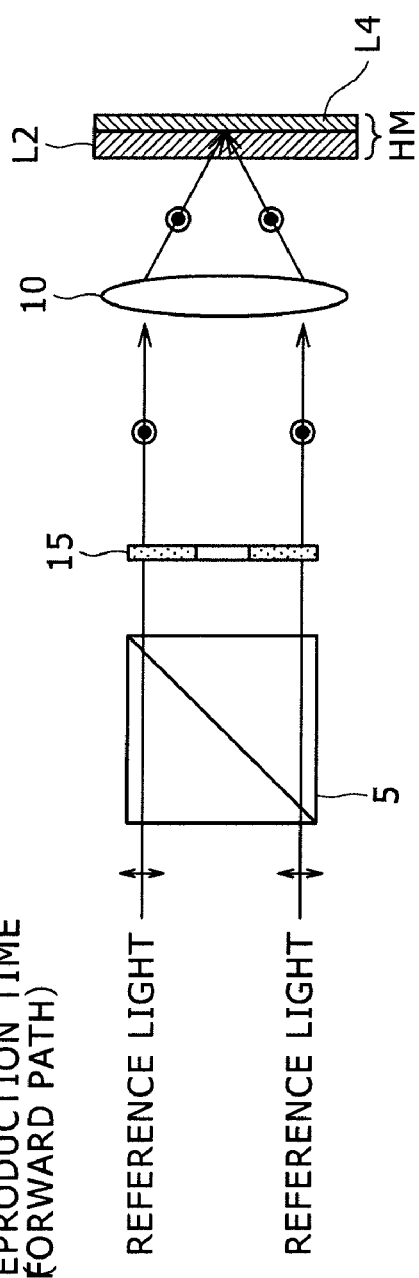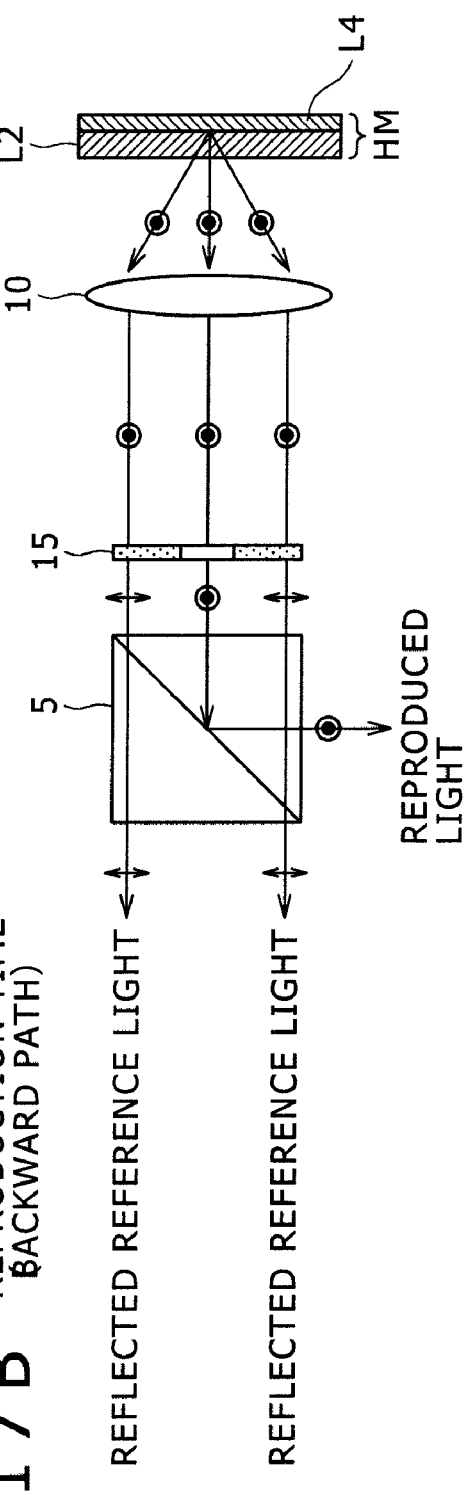

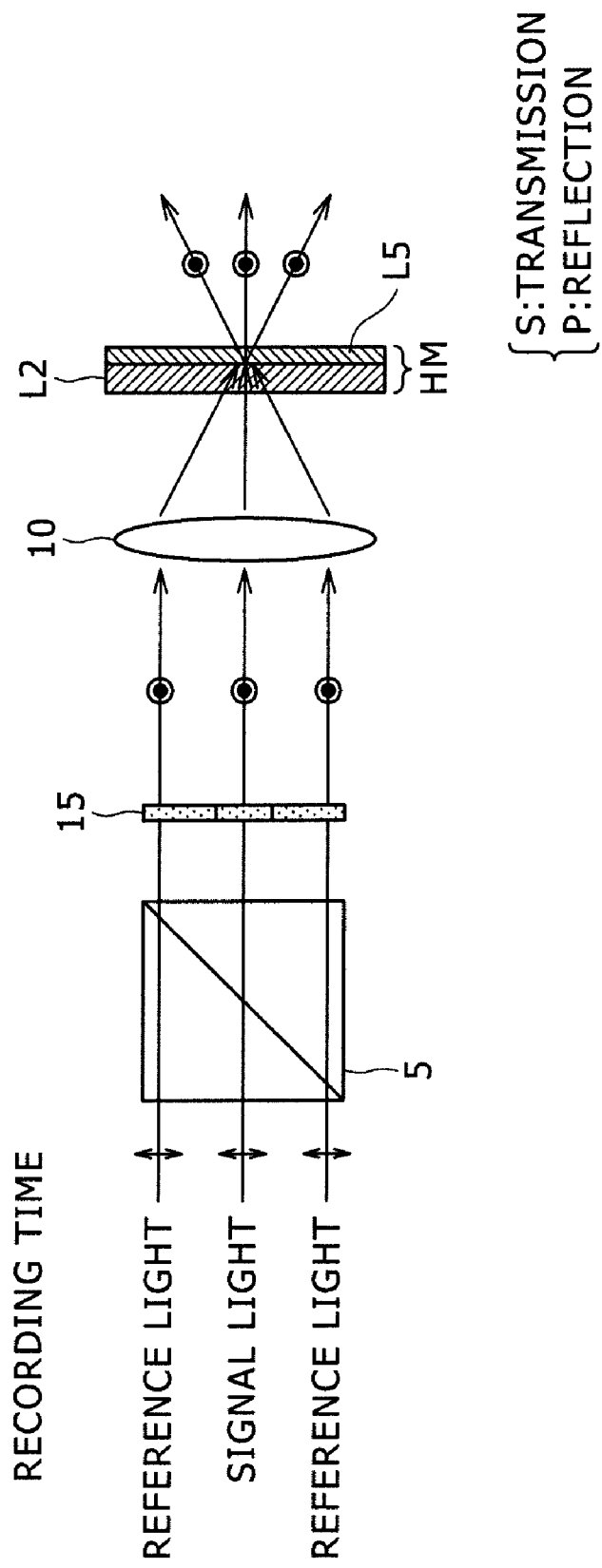

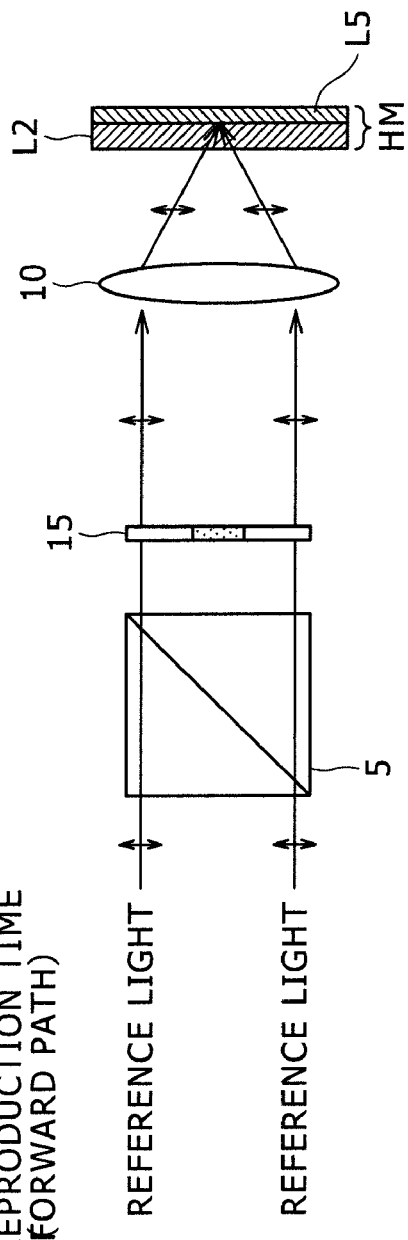
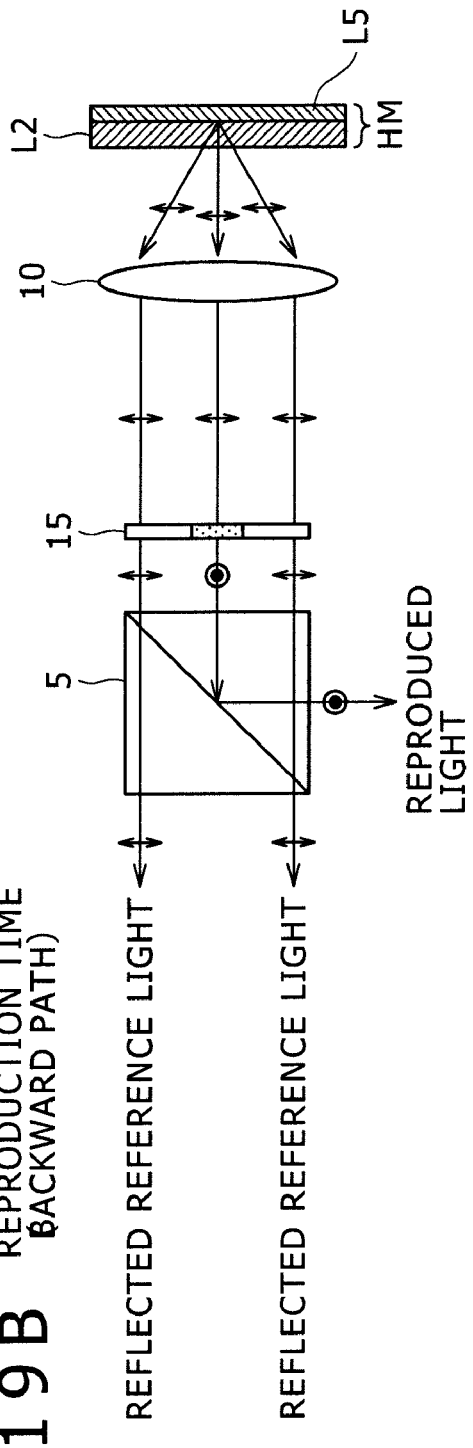
FIG. 19A  REPRODUCTION TIME (FORWARD PATH)
FIG. 19B  REPRODUCTION TIME (BACKWARD PATH)

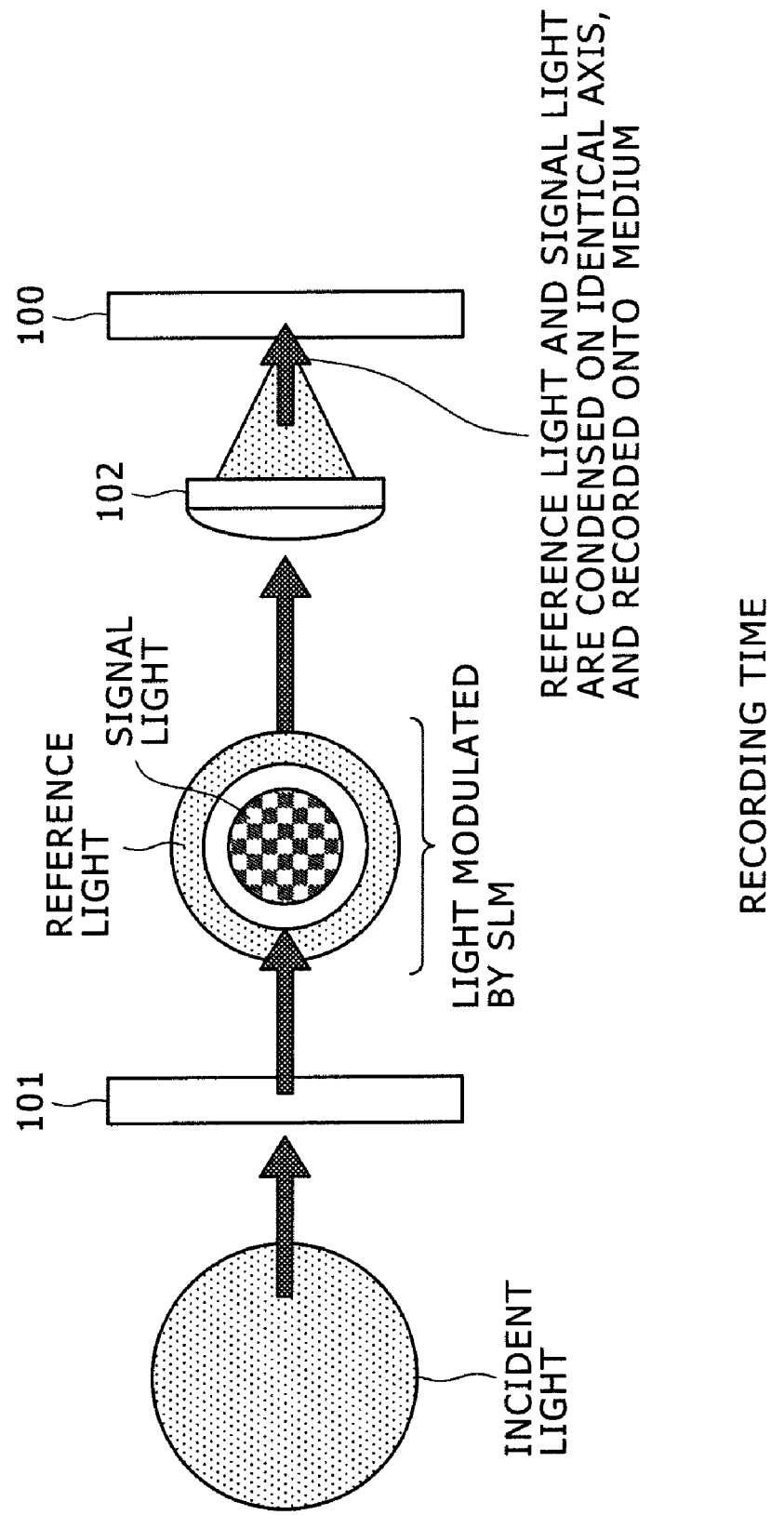

PATTERN A : SIGNAL LIGHT (FORWARD PATH)
× REFERENCE LIGHT (FORWARD PATH)

PATTERN B : SIGNAL LIGHT (FORWARD PATH)
× REFERENCE LIGHT (BACKWARD PATH)

PATTERN C : SIGNAL LIGHT (BACKWARD PATH)
× REFERENCE LIGHT (FORWARD PATH)

PATTERN D : SIGNAL LIGHT (BACKWARD PATH)
× REFERENCE LIGHT (BACKWARD PATH)

RECORDING AND REPRODUCING DEVICE AND POLARIZATION DIRECTION CONTROLLING METHOD

The present application claims priority to Japanese Patent Application JP 2008-264170 filed in the Japan Patent Office on Oct. 10, 2008, the entire contents of which is hereby incorporated by reference.

BACKGROUND OF THE INVENTION

1. Field of the Invention

The present invention relates to a recording and reproducing device that performs recording and reproduction on a hologram recording medium including a recording layer in which data is recorded by interference fringes between signal light and reference light and a reflection type circular polarization film formed under the recording layer and formed so as to output circularly polarized light in a same rotation direction as incident circularly polarized light as reflected light. The present invention also relates to a polarization direction controlling method in the recording and reproducing device.

The present invention also relates to a recording and reproducing device that performs recording and reproduction on a hologram recording medium including a recording layer in which data is recorded by interference fringes between signal light and reference light and a reflection type linear polarization film formed under the recording layer and formed so as to reflect only one of p-polarized light and s-polarized light.

2. Description of the Related Art

As described in Japanese Patent Laid-Open No. 2007-200385 (hereinafter referred to as Patent Document 1), for example, a hologram recording and reproducing system that records data by forming a hologram by interference fringes between signal light and reference light is known. In this hologram recording and reproducing system, at a time of recording, a hologram recording medium is irradiated with signal light that has undergone spatial light modulation (for example light intensity modulation) according to recording data and with reference light different from the signal light, and interference fringes (hologram) are formed on the recording medium, whereby the data is recorded.

At a time of reproduction, the recording medium is irradiated with reference light. When the recording medium is thus irradiated with the reference light, diffracted light corresponding to the interference fringes formed as described above is obtained. That is, a reproduced image (reproduced signal light) corresponding to the recording data is thereby obtained. The recording data is reproduced by detecting the thus obtained reproduced image by an image sensor such for example as a CCD (Charge Coupled Device) sensor or a CMOS (Complementary Metal Oxide Semiconductor) sensor.

FIG. 20 and FIGS. 21A and 21B are diagrams of assistance in explaining the hologram recording and reproducing system. FIG. 20 schematically shows a recording method. FIGS. 21A and 21B schematically show a reproducing method.

FIG. 20 and FIGS. 21A and 21B show a recording method and a reproducing method in a case where a so-called coaxial system, in which recording is performed with signal light and reference light arranged on an identical optical axis, is employed.

In addition, these figures illustrate a case of using a hologram recording medium 100 of a reflection type having a reflective film.

First, as shown in FIG. 20 and FIGS. 21A and 21B, in the hologram recording and reproducing system, an SLM (spatial light modulator) 101 is provided to generate signal light and reference light at a time of recording and reference light at a time of reproduction. The SLM 101 has an intensity modulator that subjects incident light to spatial light intensity modulation (referred to also as light intensity modulation or simply as intensity modulation) in pixel units. The intensity modulator can be formed by a liquid crystal panel, for example.

First, at the time of recording shown in FIG. 20, signal light given an intensity pattern corresponding to recording data by the intensity modulation of the SLM 101 and reference light given a predetermined intensity pattern are generated. The coaxial system subjects incident light to spatial light modulation such that the signal light and the reference light are arranged on an identical optical axis as shown in FIG. 20. At this time, in general, the signal light is disposed inside, and the reference light is disposed outside the signal light, as shown in FIG. 20.

The signal light and the reference light generated in the SLM 101 are applied to the hologram recording medium 100 via an objective lens 102. Thereby a hologram reflecting the recording data is formed by interference fringes between the signal light and the reference light on the hologram recording medium 100. That is, the data is recorded by the formation of the hologram.

At the time of reproduction, as shown in FIG. 21A, the SLM 101 generates reference light (the intensity pattern of the reference light at this time is the same as at the time of recording). Then, the hologram recording medium 100 is irradiated with the reference light via the objective lens 102.

In response to such irradiation of the hologram recording medium 100 with the reference light, as shown in FIG. 21B, diffracted light corresponding to the hologram formed on the hologram recording medium 100 is obtained, and thereby a reproduced image of the recorded data is obtained. In this case, the reproduced image is guided to an image sensor 103 via an objective lens 102 as shown in FIG. 21B as reflected light from the hologram recording medium 100.

The image sensor 103 receives the light of the reproduced image guided as described above in pixel units, and obtains an electric signal corresponding to an amount of received light for each pixel. The image sensor 103 thereby obtains a detected image for the reproduced image. The image signal thus detected in the image sensor 103 is a readout signal of the recorded data.

Incidentally, as is understood from the description with reference to FIG. 20 and FIGS. 21A and 21B, the hologram recording and reproducing system records/reproduces recording data in a unit of the signal light. That is, in the hologram recording and reproducing system, one hologram (referred to as a hologram page) formed by a one-time interference between the signal light and the reference light is a minimum unit of recording/reproduction.

SUMMARY OF THE INVENTION

In the above description, a reflection type hologram recording medium having a reflective film has been illustrated as the hologram recording medium 100. The recording and reproducing system ready for such a reflection type hologram recording medium has an advantage in that optical system technology for optical discs such as CDs (Compact Discs) and DVDs (Digital Versatile Discs) and the like can be diverted. On the other hand, the recording and reproducing system has a problem in that holograms formed with irradiation with the signal light and the reference light are complex.

FIGS. 22A and 22B and FIGS. 23A and 23B illustrate hologram patterns that can occur at the time of recording onto the reflection type hologram recording medium.

As shown in FIGS. 22A and 22B and FIGS. 23A and 23B, the following four patterns can occur as patterns of holograms formed when recording is performed onto the reflection type hologram recording medium.

Pattern A: signal light (forward path)×reference light (forward path)=transmission type hologram Pattern B: signal light (forward path)×reference light (backward path)=reflection type hologram Pattern C: signal light (backward path)×reference light (forward path)=reflection type hologram Pattern D: signal light (backward path)×reference light (backward path)=transmission type hologram Specifically, the transmission type hologram of pattern A shown in FIG. 22A is a hologram formed by interference between the forward path light of the signal light applied to the hologram recording medium via the objective lens and the forward path light of the reference light applied to the hologram recording medium via the objective lens. The reflection type hologram of pattern B shown in FIG. 22B is a hologram obtained by interference between the forward path light of the signal light applied to the hologram recording medium via the objective lens and the reference light as backward path light reflected from the reflective film of the hologram recording medium.

The reflection type hologram of pattern C of FIG. 23A is an opposite pattern from the above pattern B, that is, a hologram formed by interference between the forward path light of the reference light applied to the hologram recording medium via the objective lens and the signal light as backward path light reflected from the reflective film. The transmission type hologram of pattern D of FIG. 23B is a hologram formed by interference between the backward path light of the reference light reflected from the reflective film and the backward path light of the signal light reflected from the reflective film.

These four holograms differ from each other in characteristics of formed interference fringes due to difference in propagation direction and angle of the holograms. When the volume or average index of refraction of the recording medium changes because of reaction of a recording material at the time of recording, a temperature change or the like, a phase shift occurs in each hologram. Under some conditions, pieces of diffracted light from respective holograms at the time of reproduction may weaken each other, and thus the strength of the reproduced signal may be greatly decreased.

The decrease in the strength of the reproduced signal invites a decrease in SNR (S/N (Signal/Noise) ratio), a degradation in stability of reproducing operation, a decrease in recording density of the holograms, or the like.

Accordingly, in an embodiment of the present invention, in view of problems as described above, a recording and reproducing device is configured as follows.

The recording and reproducing device includes a light source for irradiating a hologram recording medium including a recording layer in which data is recorded by interference fringes between signal light and reference light and a reflection type circular polarization film formed under the recording layer and formed so as to output circularly polarized light in a same rotation direction as incident circularly polarized light as reflected light with the signal light and the reference light.

The recording and reproducing device also includes an intensity modulating section configured to subject light output from the light source to spatial light intensity modulation in pixel units, a signal light area as a region for generating the signal light and a reference light area as a region for generating the reference light being set in the intensity modulating section.

The recording and reproducing device also includes a polarization beam splitter for receiving incident light via the intensity modulating section as forward path light and receiving incident reproduced light obtained as reflected light from the hologram recording medium as backward path light.

The recording and reproducing device also includes a selective polarization direction controlling section configured to perform selective polarization direction control for changing a polarization direction of light in at least one of a reference light beam region as a light beam region of light via the reference light area and a signal light beam region as a light beam region of light via the signal light area by 90° or not changing the polarization direction according to a driving signal at a position receiving the forward path light incident via the polarization beam splitter.

The recording and reproducing device also includes a linearly polarized light/circularly polarized light converting section configured to convert linearly polarized light obtained through the selective polarization direction control by the selective polarization direction controlling section into circularly polarized light, and convert circularly polarized light obtained as reflected light from the hologram recording medium into linearly polarized light.

The recording and reproducing device further includes a driving controlling section configured to control the selective polarization direction controlling section so as to obtain a state of polarization directions of light in the reference light beam region and light in the signal light beam region being an identical direction at a time of recording and obtain a state of polarization directions of light in the reference light beam region and light in the signal light beam region being orthogonal to each other at a time of reproduction, as driving controlling section configured to control the selective polarization direction controlling section by supplying the driving signal.

As described above, in the present invention, at the time of recording, the polarization directions of the signal light and the reference light entering the linearly polarized light/circularly polarized light converting section are made to coincide with each other. According to this, the signal light and the reference light can be transmitted or reflected by the reflection type circular polarization film. When the signal light and the reference light are transmitted by the reflection type circular polarization film, for example, it is possible to record only a transmission type hologram of signal light (forward path)×reference light (forward path), and consequently the recording of reflection type holograms is prevented.

Alternatively, when the signal light and the reference light are reflected by the reflection type circular polarization film, the recording of reflection type holograms is prevented due to a property of the reflection type circular polarization film. Specifically, the reflection type circular polarization film has a property of outputting circularly polarized light in a same rotation direction as incident circularly polarized light as reflected light. Therefore, when the signal light and the reference light are reflected by the reflection type circular polarization film, the circular polarization rotation directions of the signal light and the reference light in opposed relation to each other as signal light (forward path)×reference light (backward path) and signal light (backward path)×reference light (forward path) are the same and coincide with each other, and the signal light and the reference light in the opposed relation do not interfere with each other. Thus, also when the signal light and the reference light are both reflected by the reflection type circular polarization film, the recording of reflection type holograms is prevented.

In addition, when the signal light and the reference light are thus reflected by the reflection type circular polarization film, two kinds of transmission type holograms of signal light (forward path)×reference light (forward path) and signal light (backward path)×reference light (backward path) can be recorded, and thus the thickness of the recorded hologram can be effectively doubled.

On the other hand, in the present invention, at the time of reproduction, polarization direction control is performed so as to make the polarization directions of the signal light and the reference light entering the linearly polarized light/circularly polarized light converting section orthogonal to each other. As will also be described later, this makes it possible to guide the reproduced light to an image sensor side by the polarization beam splitter, and thus perform reproducing operation properly. At the same time, the reference light in the backward path (reference light as reflected light) can be prevented from being guided to the image sensor side. Thereby degradation in reproduction characteristics is prevented at the same time.

According to another embodiment of the present invention, there is provided a polarization direction controlling method in a recording and reproducing device. The recording and reproducing device includes a light source for irradiating a hologram recording medium including a recording layer in which data is recorded by interference fringes between signal light and reference light and a reflection type circular polarization film formed under the recording layer and formed so as to output circularly polarized light in a same rotation direction as incident circularly polarized light as reflected light with the signal light and the reference light.

The recording and reproducing device also includes an intensity modulating section configured to subject light output from the light source to spatial light intensity modulation in pixel units, a signal light area as a region for generating the signal light and a reference light area as a region for generating the reference light being set in the intensity modulating section.

The recording and reproducing device also includes a polarization beam splitter configured to receive incident light via the intensity modulating section as forward path light and receive incident reproduced light obtained as reflected light from the hologram recording medium as backward path light.

The recording and reproducing device further includes a selective polarization direction controlling section configured to perform selective polarization direction control for changing a polarization direction of light in at least one of a reference light beam region as a light beam region of light via the reference light area and a signal light beam region as a light beam region of light via the signal light area by 90° or not changing the polarization direction according to a driving signal at a position receiving the forward path light incident via the polarization beam splitter.

The recording and reproducing device still further includes a linearly polarized light/circularly polarized light converting section configured to convert linearly polarized light obtained through the selective polarization direction control by the selective polarization direction controlling section into circularly polarized light, and convert circularly polarized light obtained as reflected light from the hologram recording medium into linearly polarized light.

The polarization direction controlling method includes the step of controlling a polarization direction so as to obtain a state of polarization directions of light in the reference light beam region and light in the signal light beam region being an identical direction at a time of recording and obtain a state of polarization directions of light in the reference light beam region and light in the signal light beam region being orthogonal to each other at a time of reproduction by supplying the driving signal.

According to still further embodiment of the present invention, there is provided a recording and reproducing device including a light source for irradiating a hologram recording medium including a recording layer in which data is recorded by interference fringes between signal light and reference light and a reflection type linear polarization film formed under the recording layer and formed so as to reflect only one of p-polarized light and s-polarized light with the signal light and the reference light.

The recording and reproducing device also includes an intensity modulating section configured to subject light output from the light source to spatial light intensity modulation in pixel units, a signal light area as a region for generating the signal light and a reference light area as a region for generating the reference light being set in the intensity modulating section.

The recording and reproducing device further includes a polarization beam splitter configured to receive incident light via the intensity modulating section as forward path light and receive incident reproduced light obtained as reflected light from the hologram recording medium as backward path light.

The recording and reproducing device still further includes a selective polarization direction controlling section configured to perform selective polarization direction control for changing a polarization direction of light in at least one of a reference light beam region as a light beam region of light via the reference light area and a signal light beam region as a light beam region of light via the signal light area by 90° or not changing the polarization direction according to a driving signal at a position receiving the forward path light incident via the polarization beam splitter.

The recording and reproducing device still further includes a driving controlling section configured to control the selective polarization direction controlling section so as to obtain a state of a polarization direction of light in the reference light beam region at a time of recording and a polarization direction of light in the reference light beam region at a time of reproduction being orthogonal to each other, polarization directions of the light in the reference light beam region and light in the signal light beam region at the time of recording being both an identical direction, and polarization directions of the light in the reference light beam region and light in the signal light beam region at the time of reproduction being orthogonal to each other, as driving controlling section configured to control the selective polarization direction controlling section by supplying the driving signal.

According to the present invention, the recording of reflection type holograms can be prevented even though a reflection type hologram recording medium is used. This makes it possible to obtain stable diffraction efficiency even when a contraction of the recording medium due to recording or a temperature change occurs. Consequently, degradation in S/N ratio is prevented, reproduction stability is improved, and recording density is improved.

In addition, because the present invention employs a method of controlling the rotation direction of circularly polarized light with which the hologram recording medium is irradiated using a reflection type circular polarization film as a reflective film, the recording of reflection type holograms can be prevented even when recording and reproduction is performed while the hologram recording medium is rotation-driven.

BRIEF DESCRIPTION OF THE DRAWINGS

FIG. 1 is a block diagram showing an internal configuration of a recording and reproducing device according to an embodiment;

FIG. 6 is a diagram of assistance in explaining a polarization direction controlling method (at the time of recording) as a first example of a first embodiment;

FIGS. 7A and 7B are diagrams of assistance in explaining the polarization direction controlling method (at the time of reproduction) as the first example of the first embodiment;

FIG. 8 is a diagram of assistance in explaining a polarization direction controlling method (at the time of recording) as a second example of the first embodiment;

FIGS. 9A and 9B are diagrams of assistance in explaining the polarization direction controlling method (at the time of reproduction) as the second example of the first embodiment;

FIGS. 10A and 10B are diagrams of assistance in explaining a polarization direction controlling method (at the time of recording) as a first example of a second embodiment;

FIGS. 11A and 11B are diagrams of assistance in explaining the polarization direction controlling method (at the time of reproduction) as the first example of the second embodiment;

FIGS. 12A and 12B are diagrams of assistance in explaining a polarization direction controlling method (at the time of recording) as a second example of the second embodiment;

FIGS. 13A and 13B are diagrams of assistance in explaining the polarization direction controlling method (at the time of reproduction) as the second example of the second embodiment;

FIG. 15 is a block diagram showing an internal configuration of a recording and reproducing device as an example of modification corresponding to a case in which a reflection type linear polarization film is provided as a reflective film;

FIG. 16 is a diagram of assistance in explaining a polarization direction controlling method (at the time of recording) as an example of modification;

FIGS. 17A and 17B are diagrams of assistance in explaining the polarization direction controlling method (at the time of reproduction) as the example of modification;

FIG. 18 is a diagram of assistance in explaining a polarization direction controlling method (at the time of recording) as another example of the example of modification;

FIGS. 19A and 19B are diagrams of assistance in explaining the polarization direction controlling method (at the time of reproduction) as the other example of the example of modification;

FIG. 20 is a diagram of assistance in explaining a hologram recording and reproducing system (at the time of recording) based on a coaxial system;

DETAILED DESCRIPTION OF THE PREFERRED EMBODIMENTS

Figure 2A:
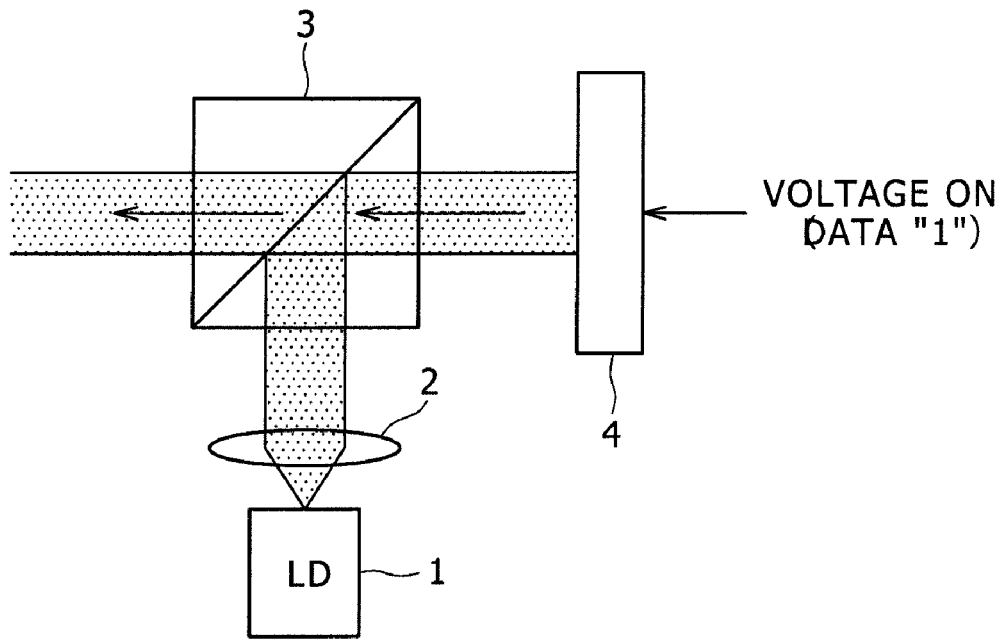
FIGS. 2A and 2B are diagrams of assistance in explaining an intensity modulating method by a combination of a polarization direction control type spatial light modulator and a polarization beam splitter.

The best mode for carrying out the invention (hereinafter referred to as embodiments) will hereinafter be described.

Incidentally, description will be made in the following order.

First Embodiment

[Configuration of Recording and reproducing device]
[Polarization direction controlling method as First example]
[Polarization direction controlling method as Second example]

Summary of First Embodiment

Second Embodiment

[Polarization direction controlling method as First example]
[Polarization direction controlling method as Second example]

Summary of Second Embodiment

Examples of Modification

First Embodiment

[Configuration of Recording and Reproducing Device]

FIG. 1 is a block diagram showing an internal configuration of a recording and reproducing device according to an embodiment of the present invention.

The recording and reproducing device shown in FIG. 1 is configured to perform hologram recording and reproduction by a coaxial system. In the coaxial system, signal light and reference light are arranged on a same optical axis, a hologram recording medium set at a predetermined position is irradiated with both of the signal light and the reference light, and data is recorded by forming a hologram, and the data recorded as the hologram is reproduced by irradiating the hologram recording medium with the reference light at a time of reproduction.

In addition, the recording and reproducing device shown in FIG. 1 has a configuration corresponding to a reflection type hologram recording medium provided with a reflecting film as hologram recording medium HM in the figure.

In FIG. 1, a laser diode (LD) 1 is provided as a light source for obtaining laser light for recording and reproduction. A laser diode provided with an external resonator, for example, is employed as the laser diode 1, and the wavelength of the laser light is about 410 nm, for example.

Light emitted from the laser diode 1 is passed through a collimator lens 2, and then guided to a polarization beam splitter 3.

When a plane of incidence is represented by an x-axis and y-axis plane, the polarization beam splitter 3 is formed so as to transmit x-polarized light (p-polarized light) whose polarization direction coincides with the direction of the x-axis and reflect y-polarized light (s-polarized light) whose polarization direction coincides with the direction of the y-axis.

Thus, of the laser light (linearly polarized light) emitted from the laser diode 1 and entering the polarization beam splitter 3 as described above, x-polarized light is transmitted by the polarization beam splitter 3, and only y-polarized light is reflected by the polarization beam splitter 3.

The light (y-polarized light) reflected by the polarization beam splitter 3 enters an SLM (Spatial light modulator) 4.

The SLM 4 includes a reflection type liquid crystal element as an FLC (Ferroelectric Liquid Crystal). The SLM 4 is formed so as to control the polarization direction of the incident light in pixel units.

The SLM 4 performs spatial light modulation by changing the polarization direction of the incident light by 90° or not changing the polarization direction of the incident light for each pixel according to a driving signal from a modulation controlling section 12 in FIG. 1. Specifically, the SLM 4 is configured to control the polarization direction in pixel units according to the driving signal such that a change in angle of the polarization direction=90° when the driving signal is ON and a change in angle of the polarization direction=0° when the driving signal is OFF.

As shown in FIG. 1, the light emitted from the above-described SLM 4 (light reflected by the SLM 4) enters the polarization beam splitter 3 again.

In this case, the recording and reproducing device shown in FIG. 1 performs spatial light intensity modulation (referred to also as light intensity modulation or simply as intensity modulation) in pixel units using polarization direction control in pixel units by the SLM 4 and the property of selective transmission/reflection of the polarization beam splitter 3 according to the polarization direction of the incident light.

Figure 2B:
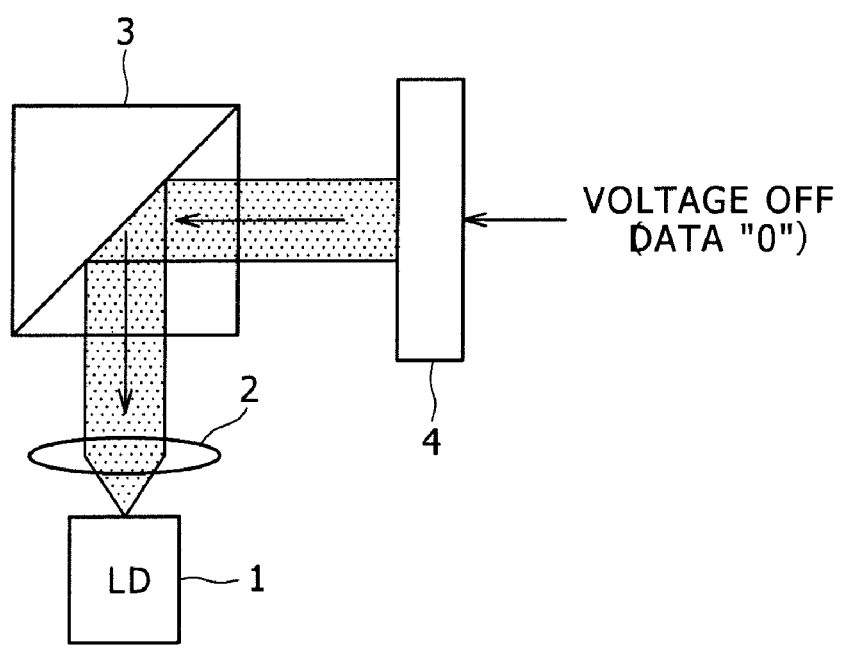

FIGS. 2A and 2B show an image of the operation of intensity modulation achieved by a combination of the SLM 4 and the polarization beam splitter 3. FIG. 2A schematically shows a light beam state of light of an ON pixel, and FIG. 2B schematically shows a light beam state of light of an OFF pixel.

As described above, the polarization direction of the incident light from the laser diode 1 side to the polarization beam splitter 3 is the y-direction in this case. The polarization beam splitter 3 transmits x-polarized light and reflects y-polarized light, and therefore the y-polarized light enters the SLM 4.

On the basis of this premise, the light of a pixel whose polarization direction is changed by 90° by the SLM 4 (light of a pixel when the driving signal is ON) enters the polarization beam splitter 3 as x-polarized light. Thus, the light of the ON pixel in the SLM 4 is transmitted by the polarization beam splitter 3, and guided to the hologram recording medium HM (FIG. 2A).

On the other hand, the light of a pixel whose polarization direction is not changed when the driving signal is OFF enters the polarization beam splitter 3 as y-polarized light. That is, the light of the OFF pixel in the SLM 4 is reflected by the polarization beam splitter 3, and is not guided to the hologram recording medium HM (FIG. 2B).

Thus, an intensity modulating section configured to perform light intensity modulation in pixel units is formed by a combination of the SLM 4 performing polarization direction control in pixel units and the polarization beam splitter 3.

In this case, the coaxial system is employed as a hologram recording and reproducing system in the present embodiment. When the coaxial system is employed, areas as shown in FIG. 3 are set in the SLM 4 to arrange signal light and reference light on a same optical axis.

Figure 3:
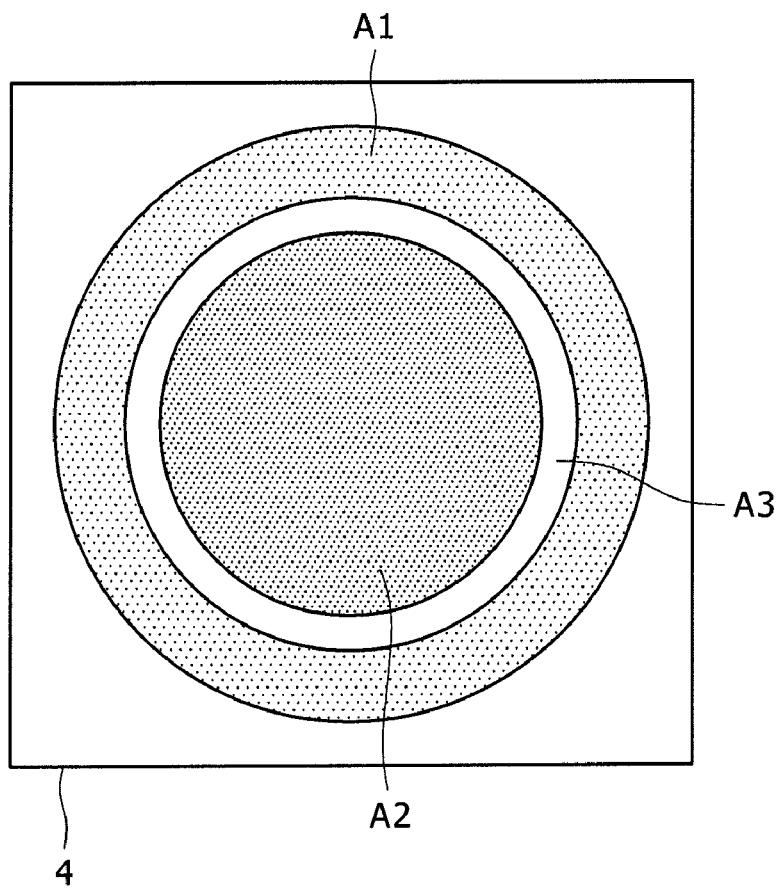
FIG. 3 is a diagram of assistance in explaining each of a reference light area, a signal light area, and a gap area set in a spatial light modulator.

As shown in FIG. 3, in the SLM 4, an area of a predetermined region in a substantially circular shape including the center of the SLM 4 (which center coincides with the optical axis of the laser light) is set as a signal light area A2. A reference light area A1 in a substantially annular shape is set outside the signal light area A2 with a gap area A3 between the reference light area A1 and the signal light area A2.

The setting of the signal light area A2 and the reference light area A1 enables the signal light and the reference light to be arranged on a same optical axis for irradiation.

Incidentally, the gap area A3 is set as a region for preventing the reference light generated in the reference light area A1 from leaking into the signal light area A2 and becoming noise of the signal light.

Returning to FIG. 1, the modulation controlling section 12 performs driving control on the SLM 4 to generate the signal light and the reference light at a time of recording and generate the reference light at a time of reproduction.

Specifically, the modulation controlling section 12 at a time of recording generates a driving signal to set pixels within the signal light area A2 in the SLM 4 in an on/off pattern corresponding to recording data supplied to the modulation controlling section 12, set pixels in the reference light area A1 in a predetermined on/off pattern, and turn off all of other pixels. The modulation controlling section 12 supplies the driving signal to the SLM 4. The SLM 4 performs spatial light modulation (polarization direction control) on the basis of the driving signal, whereby signal light and reference light each arranged so as to have the optical axis of the laser light as a center thereof are obtained as light emitted from the polarization beam splitter 3 (light transmitted by the polarization beam splitter 3).

The modulation controlling section 12 at a time of reproduction performs driving control on the SLM 4 by a driving signal to set the pixels within the reference light area A1 in the predetermined on/off pattern and turn off all of the other pixels, whereby only reference light is obtained as light emitted from the polarization beam splitter 3.

Incidentally, the modulation controlling section 12 at the time of recording operates so as to generate an on/off pattern within the signal light area for each predetermined unit of the input recording data string and thereby sequentially generate signal light storing the data of each predetermined unit of the recording data string. Thereby, data is sequentially recorded onto the hologram recording medium HM in hologram page units (data units that can be recorded by one-time interference between signal light and reference light).

The laser light transmitted by the polarization beam splitter 3 is guided to a polarization beam splitter 5. The polarization beam splitter 5 is also formed so as to transmit x-polarized light (p-polarized light) and reflect y-polarized light (s-polarized light). Therefore the laser light transmitted by the polarization beam splitter 3 (x-polarized light) is transmitted by the polarization beam splitter 5.

The laser light transmitted by the polarization beam splitter 5 is guided to a relay lens system in which a relay lens 6, an aperture 7, and a relay lens 8 are arranged in this order as shown in FIG. 1. As shown in FIG. 1, the relay lens 6 condenses the laser light transmitted by the polarization beam splitter 5 at a predetermined focal position, and the relay lens 8 converts the laser light as diffused light after being condensed into collimated light. The aperture 7 is disposed at the focal position (Fourier plane: frequency plane) of the relay lens 6. The aperture 7 is formed so as to transmit only light within a predetermined region with the optical axis as a center and block other light. The aperture 7 limits the size of a hologram page recorded onto the hologram recording medium HM, and thus improves the recording density of holograms (that is, data recording density).

The laser light passed through the above-described relay lens system enters a quarter-wave plate 9 via a selective polarization direction controlling element 15 to be described later.

Incidentally, for convenience of description in the following, suppose that the selective polarization direction controlling element 15 is not inserted and that the laser light passed through the relay lens system enters the quarter-wave plate 9 while remaining x-polarized light (p-polarized light).

The quarter-wave plate 9 converts the laser light formed by the x-polarized light into circularly polarized light. Then, the hologram recording medium HM is irradiated with the laser light thus converted into circularly polarized light via an objective lens 10.

As will also be described later, the hologram recording medium HM includes a recording layer in which hologram recording is performed and a reflective film formed under the recording layer.

Incidentally, for convenience of description in the following, suppose that an ordinary reflective film such for example as a metallic film is formed as the reflective film in the hologram recording medium HM.

At the time of recording, signal light that underwent light intensity modulation according to recording data and reference light that is given a predetermined intensity pattern are generated on the basis of control of the above-described modulation controlling section 12. The hologram recording medium HM is irradiated with the signal light and the reference light thus generated through the optical path described above. Thereby, a hologram reflecting the recording data is formed by interference fringes between the signal light and the reference light on the hologram recording medium HM (recording layer). That is, data recording is performed.

On the other hand, at the time of reproduction, only reference light is generated as described above. The hologram recording medium HM is irradiated with the reference light through the optical path described above. Diffracted light corresponding to the hologram formed on the hologram recording medium HM is obtained in response to the irradiation with the reference light. That is, a reproduced image (reproduced light) corresponding to the data recorded on the hologram recording medium HM is obtained.

The reproduced light thus obtained in response to the irradiation with the reference light is passed through the objective lens 10, then passed through the quarter-wave plate 9 and the above-described relay lens system, and guided to the polarization beam splitter 5 as reflected light from the hologram recording medium HM.

Because it is assumed in this case that the selective polarization direction controlling element 15 is not inserted and that an ordinary reflective film is provided as the reflective film of the hologram recording medium HM, the reproduced light guided to the polarization beam splitter 5 as described above enters the polarization beam splitter 5 as y-polarized light due to the action of the quarter-wave plate 9. Thus, the reproduced light is reflected by the polarization beam splitter 5. The reflected light is guided to an image sensor 11 as shown in FIG. 1.

An important point here is that with the constitution of the optical system in this case, when the reflected light from the hologram recording medium HM enters the polarization beam splitter as y-polarized light, the reflected light is guided to the image sensor 11 side. In other words, when the reflected light from the hologram recording medium HM enters the polarization beam splitter as x-polarized light, the reflected light is not guided to the image sensor 11 side.

The image sensor 11 includes an image pickup element such for example as a CCD (Charge Coupled Device) sensor or a CMOS (Complementary Metal Oxide Semiconductor) sensor. The image sensor 11 receives the thus guided reproduced light from the hologram recording medium HM, and converts the reproduced light into an electric signal, thereby obtaining an image signal. The thus obtained image signal reflects the light on/off pattern (that is, a data pattern of "0" and "1") in the signal light at the time of recording. That is, the image signal thus detected in the image sensor 11 corresponds to a readout signal of the data recorded on the hologram recording medium HM.

A data reproducing section 13 identifies the data of "0" or "1" for each of values of pixel units of the SLM 4 which values are included in the image signal detected by the above-described image sensor 11, and performs a demodulating process for a recording modulation code as required. The data reproducing section 13 thereby reproduces the recording data.

Incidentally, the recording and reproducing device shown in FIG. 1 has a controlling section 16 for performing driving control of the above-described selective polarization direction controlling element 15. The controlling section 16 will also be described later.

[Polarization Direction Controlling Method as First Example]

As described above, the recording and reproducing device according to the present embodiment performs recording and reproduction on a reflection type hologram recording medium provided with a reflective film.

As described earlier with reference to FIGS. 22A and 22B and FIGS. 23A and 23B, the following four holograms are recorded when recording is performed on a reflection type hologram recording medium.

Pattern A: signal light (forward path)×reference light (forward path)=transmission type hologram Pattern B: signal light (forward path)×reference light (backward path)=reflection type hologram Pattern C: signal light (backward path)×reference light (forward path)=reflection type hologram Pattern D: signal light (backward path)×reference light (backward path)=transmission type hologram Specifically, the transmission type hologram of pattern A (FIG. 22A) is a hologram formed by interference between the forward path light of the signal light applied to the hologram recording medium via the objective lens and the forward path light of the reference light applied to the hologram recording medium via the objective lens. The reflection type hologram of pattern B (FIG. 22B) is a hologram formed by interference between the forward path light of the signal light applied to the hologram recording medium via the objective lens and the reference light as backward path light reflected from the reflective film of the hologram recording medium.

The reflection type hologram of pattern C as an opposite pattern from the above pattern B (FIG. 23A) is a hologram formed by interference between the forward path light of the reference light applied to the hologram recording medium via the objective lens and the signal light as backward path light reflected from the reflective film of the hologram recording medium. The transmission type hologram of pattern D (FIG. 23B) is a hologram formed by interference between the backward path light of the signal light reflected from the reflective film and the backward path light of the reference light reflected from the reflective film.

These four holograms differ from each other in characteristics of formed interference fringes due to difference in propagation direction and angle of the holograms. When the volume or average index of refraction of the recording medium changes because of reaction of a recording material at the time of recording, a temperature change or the like, a phase shift occurs in each hologram. Under some conditions, pieces of diffracted light from respective holograms at the time of reproduction may weaken each other, and thus the strength of the reproduced signal may be greatly decreased.

The decrease in the strength of the reproduced signal invites a decrease in SNR (S/N ratio), a degradation in stability of reproducing operation, a decrease in recording density of the holograms, or the like.

In view of this point, the present embodiment prevents the recording of the respective reflection type holograms of pattern B and pattern C described above, and allows the recording of only the transmission type holograms. Thereby, the decrease in the strength of the reproduced signal is suppressed, and the above-described problem is solved.

As a method for thus preventing the recording of the reflection type holograms, a method for allowing the recording of only the transmission type hologram of the above-described pattern A (signal light (forward path)×reference light (forward path)) is proposed in the first embodiment.

As the method of the first embodiment, two embodiments, that is, a first example and a second example will be described in the following. The method of the first example will first be described with reference to FIGS. 4 to 7B.

Figure 4:
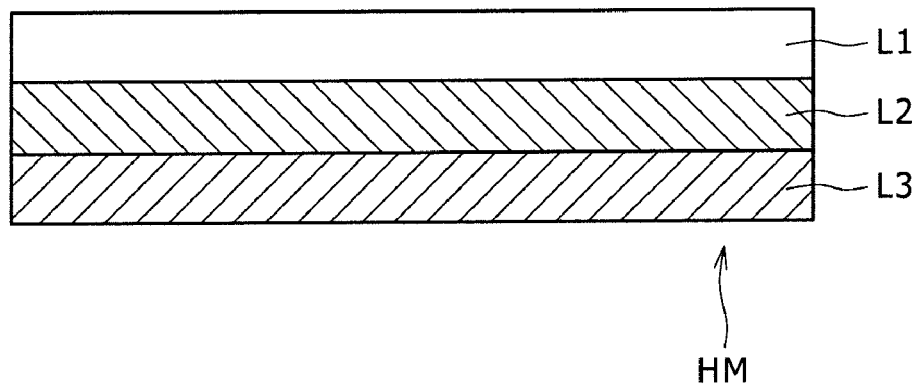
FIG. 4 is a diagram showing a sectional structure of a hologram recording medium according to an embodiment.

FIG. 4 shows a sectional structure of the hologram recording medium HM used in the first example of the first embodiment.

As shown in FIG. 4, a cover layer L1, a recording layer L2, and a reflection type circular polarization film L3 are formed in order from the top layer in the hologram recording medium HM in the first example.

The cover layer L1 is provided to protect the recording layer L2 formed under the cover layer L1. The cover layer L1 is formed by a transparent substrate such for example as glass or polycarbonate. The recording layer L2 is a layer of a photosensitive material (recording material) such for example as a photopolymer in which hologram recording is performed by interference fringes between the signal light and the reference light.

The reflection type circular polarization film L3 is formed of a material having circular polarization selective reflectivity which material transmits circularly polarized light in a predetermined rotation direction and reflects circularly polarized light in an opposite rotation direction from the predetermined rotation direction. Specifically, the reflection type circular polarization film L3 is formed of a cholesteric liquid crystal.

In the hologram recording medium HM used in the first example, the winding direction of helical structure of the cholesteric liquid crystal as the reflection type circular polarization film L3 is a left direction. Thus, circularly polarized light in a right-handed direction is transmitted, and circularly polarized light in a left-handed direction is selectively reflected.

Incidentally, the structure of the hologram recording medium HM shown in FIG. 4 is a mere example, and another structure may be formed for example by providing a gap layer of an inorganic material of a few μm to a few ten μm so as to prevent unnecessary reaction between the recording layer L2 and the reflection type circular polarization film L3.

On the other hand, the selective polarization direction controlling element 15 shown in FIG. 1 and the controlling section 16 configured to perform driving control of the selective polarization direction controlling element are provided to perform polarization direction control for recording only the transmission type hologram of pattern A in correspondence with the hologram recording medium HM having the reflection type circular polarization film L3 thus formed therein and guiding reproduced light to the image sensor 11 side properly at the time of reproduction.

Figure 5:
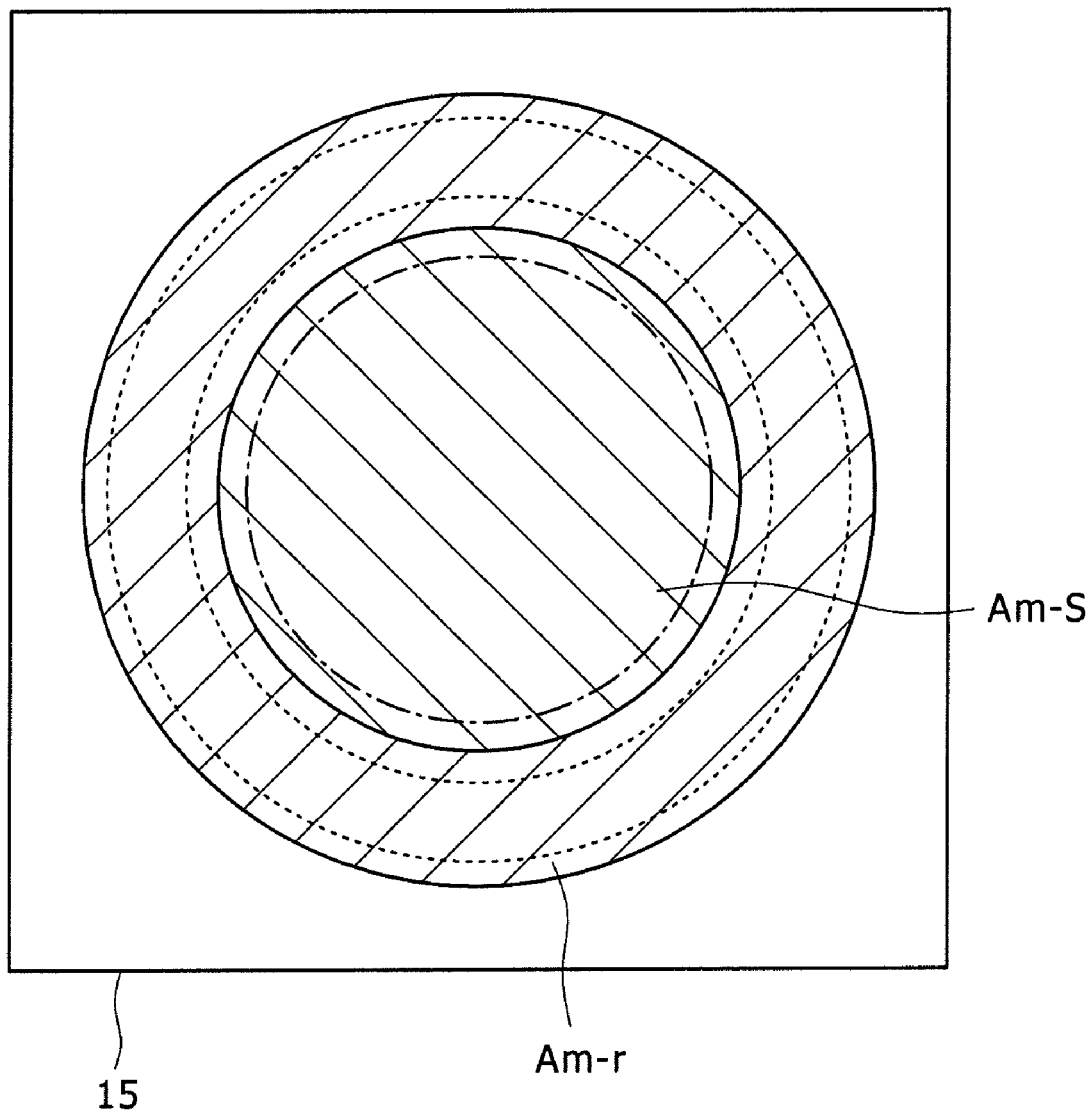
FIG. 5 is a diagram of assistance in explaining a structure of a selective polarization direction controlling element.

FIG. 5 is a diagram schematically showing a structure of the selective polarization direction controlling element 15.

Incidentally, in FIG. 5, a region on which light in the light beam region of reference light is incident as the light beam region of light passed through the reference light area A1 of the SLM 4 is indicated by a broken line, and a region on which light in the light beam region of signal light is incident as the light beam region of light passed through the signal light area A2 of the SLM 4 is indicated by alternate long and short dashed lines.

Incidentally, the region on which light in the light beam region of reference light is incident in the selective polarization direction controlling element 15 will hereinafter be referred to as a "reference light area of the selective polarization direction controlling element 15," and similarly the region on which light in the light beam region of signal light is incident in the selective polarization direction controlling element 15 will hereinafter be referred to as a "signal light area of the selective polarization direction controlling element 15."

As shown in FIG. 5, in the selective polarization direction controlling element 15, a signal light controlling region Am-s is set as a range that includes the signal light area of the selective polarization direction controlling element 15 and which does not overlap the reference light area of the selective polarization direction controlling element 15. In addition, a range that includes the reference light area of the selective polarization direction controlling element 15 and which does not overlap the signal light area of the selective polarization direction controlling element 15 is set as a reference light controlling region Am-r.

The selective polarization direction controlling element 15 is inserted at the position of a real image plane of the SLM 4 which plane is formed by the relay lens system including the relay lenses 6 and 8 in the optical system shown in FIG. 1. Alternatively, the selective polarization direction controlling element 15 is inserted at a position adjacent to the real image plane. In correspondence with this, the reference light area and the signal light area of the selective polarization direction controlling element 15 are set in substantially the same sizes as the reference light area A1 and the signal light area A2, respectively, of the SLM 4.

The attachment position of the selective polarization direction controlling element 15 in a plane parallel to the plane of incidence is adjusted such that the whole light in the reference light beam region is covered by the reference light area of the selective polarization direction controlling element 15 and the whole light in the signal light beam region is covered by the signal light area of the selective polarization direction controlling element 15. Specifically, in this case, because the signal light area A2 is disposed inside the reference light area A1 and the center of the signal light area A2 coincides with the optical axis of the laser light, the in-plane attachment position of the selective polarization direction controlling element 15 is adjusted such that the center of the signal light controlling region Am-s coincides with the optical axis of the laser light.

At least the signal light controlling region Am-s and the reference light controlling region Am-r of the selective polarization direction controlling element 15 are formed by a liquid crystal element that performs phase modulation with an amount of phase modulation π or zero according to the on/off state of the driving signal (a phase difference of π is given between an amount of phase modulation when the driving signal is on and an amount of phase modulation when the driving signal is off).

Specifically, such a liquid crystal element can be realized by adjusting the thickness of the liquid crystal element such that a phase difference of π (λ/2) occurs between the off time of the driving signal (time of horizontal alignment of liquid crystal molecules) and the on time of the driving signal (time of vertical alignment of the liquid crystal molecules).

The liquid crystal element thus formed so as to perform phase modulation with π or zero according to the on/off state of the driving signal has a similar property to that of a half-wave plate.

As is well known, letting θ be an angle formed by the optical reference axis of the half-wave plate and the polarization direction axis of incident light, the half-wave plate has a property of changing the polarization direction of the incident light by 2θ. Thus, the signal light controlling region Am-s and the reference light controlling region Am-r of the selective polarization direction controlling element 15 formed as described above can change the polarization direction of incident light by 90° or change the polarization direction of the incident light by 0° (that is, make the polarization direction of the incident light unchanged) independently of each other according to the on/off state of the driving signal supplied to the selective polarization direction controlling element 15.

Incidentally, for confirmation, in order to enable 90°/0° polarization direction control as described above, the selective polarization direction controlling element 15 is used with the in-plane attachment angle of the selective polarization direction controlling element 15 adjusted such that an angle formed by the optical reference axis of the selective polarization direction controlling element 15 and the polarization direction axis of the incident light (x-direction in this case) is 45°.

The controlling section 16 shown in FIG. 1 performs proper driving control to be described later on the selective polarization direction controlling element 15, thereby realizing a polarization direction controlling method for properly guiding reproduced light to the image sensor 11 side at the time of reproduction while preventing the recording of reflection type holograms.

FIG. 6 and FIGS. 7A and 7B are diagrams of assistance in explaining the polarization direction controlling method as the first example of the first embodiment.

Only the polarization beam splitter 5, the selective polarization direction controlling element 15, the quarter-wave plate 9, the objective lens 10, and the hologram recording medium HM shown in FIG. 1 are extracted and shown in FIG. 6 and FIGS. 7A and 7B.

FIG. 6 shows the respective light beams of the signal light and the reference light and the polarized states of the respective light beams as a diagram of assistance in explaining the recording time.

FIGS. 7A and 7B are diagrams of assistance in explaining the reproduction time. FIG. 7A shows the light beam of the reference light in the forward path and the polarized state of the light beam. FIG. 7B shows the light beams of the reference light (reflected reference light) and reproduced light in the backward path and the polarized states of the light beams.

Incidentally, in regard to the polarized states shown in FIG. 6 and FIGS. 7A and 7B, a double-headed arrow in a vertical direction of the figures represents linearly polarized light parallel to a paper surface (p-polarized light), a double circle represents linearly polarized light perpendicular to the paper surface (s-polarized light), a solid-line right-handed arrow represents circularly polarized light in a right-handed direction, and a broken-line left-handed arrow represents circularly polarized light in a left-handed direction. For confirmation, the rotation direction of polarized light is defined as a rotation direction with respect to a traveling direction of light waves.

First, in FIG. 6, at the time of recording in the first example, the driving signal is turned off for both the signal light controlling region Am-s and the reference light controlling region Am-r of the selective polarization direction controlling element 15, and thereby the polarization directions of the incident reference light and the incident signal light are unchanged.

According to this, both the signal light and the reference light that entered the selective polarization direction controlling element 15 as p-polarized light are converted into circularly polarized light in the right-handed direction by the quarter-wave plate 9, and the hologram recording medium HM is irradiated with the circularly polarized light in the right-handed direction via the objective lens 10.

As described earlier with reference to FIG. 4, the reflection type circular polarization film L3 formed in the hologram recording medium HM is configured to transmit circularly polarized light in the right-handed direction and reflect circularly polarized light in the left-handed direction. Thus, at the time of recording in this case, the signal light and the reference light are both transmitted by the reflection type circular polarization film L3 as shown in FIG. 6.

Thus, in the recording layer L2 in this case, only one kind of transmission type hologram of signal light (forward path)× reference light (forward path) is recorded, and consequently the recording of reflection type holograms can be prevented.

On the other hand, at the time of reproduction, as shown in FIGS. 7A and 7B, the driving signal of the signal light controlling region Am-s in the selective polarization direction controlling element 15 remains turned off, and the driving signal of only the reference light controlling region Am-r is turned on. That is, the polarization direction is changed by 90° in only the reference light controlling region Am-r.

According to this, first, in the forward path of FIG. 7A, the reference light entering the quarter-wave plate 9 via the selective polarization direction controlling element 15 is converted from p-polarized light to s-polarized light, and the hologram recording medium HM is accordingly irradiated with the reference light as circularly polarized light in the left-handed direction. Thus, at the time of reproduction, the reference light can be reflected from the reflection type circular polarization film L3, and reproduced light obtained by the irradiation with the reference light can also be reflected from the reflection type circular polarization film L3. As a result, as shown in FIG. 7B, the reflected reference light and the reproduced light can be obtained as light in the backward path (return light from the hologram recording medium HM).

In the present embodiment, a cholesteric liquid crystal is selected as the reflection type circular polarization film L3 formed in the hologram recording medium HM, and is formed so as to output circularly polarized light in a same rotation direction as incident circularly polarized light as reflected light.

Thus, in a form of preserving the rotation direction of the incident left-handed reference light, the rotation directions of the respective pieces of circularly polarized light of the reflected reference light and the reproduced light obtained as reflected light from the reflection type circular polarization film L3 as described above are similarly the left-handed direction.

The reflected reference light and the reproduced light thus obtained as circularly polarized light in the left-handed direction are passed through the objective lens 10, then passed through the quarter-wave plate 9, and thereby converted into s-polarized light.

The selective polarization direction controlling element 15 at the time of reproduction in this case is controlled such that the reference light controlling region Am-r is on and the signal light controlling region Am-s is off, as described above. Thus, the reproduced light converted into s-polarized light in the quarter-wave plate 9 as described above has the polarization direction thereof unchanged after being passed through the selective polarization direction controlling element 15, and enters the polarization beam splitter 5 as s-polarized light. That is, as a result, the reproduced light is properly guided to the image sensor 11 side.

According to the controlled state of the selective polarization direction controlling element 15 at the time of reproduction, the reflected reference light converted into s-polarized light by the quarter-wave plate 9 has the polarization direction thereof changed by 90° by being passed through the selective polarization direction controlling element 15, and enters the polarization beam splitter 5 as p-polarized light. As a result, the reflected reference light is transmitted by the polarization beam splitter 5, and is thus not guided to the image sensor 11 side.

For confirmation, whereas the reproduced light has relatively low light intensity dependent on the diffraction efficiency (for example about 0.1% to 1%) of the hologram, the reflected reference light is simply light reflected from the reflection type circular polarization film L3 irrespective of the diffraction efficiency, and therefore the light intensity of the reflected reference light is considerably higher than that of the reproduced light. Thus, when the reflected reference light is guided to the image sensor 11 together with the reproduced light, the reflected reference light becomes a non-negligible noise component of the reproduced light, so that reproduction characteristics are greatly degraded.

Thus, according to the polarization direction controlling method according to the present embodiment that can prevent the reflected reference light from being guided to the image sensor 11 side as described above, reproduction characteristics can be improved by suppressing noise.

[Polarization Direction Controlling Method as Second Example]

The second example of the first embodiment will next be described.

As in FIG. 6 and FIGS. 7A and 7B, only the polarization beam splitter 5, the selective polarization direction controlling element 15, the quarter-wave plate 9, the objective lens 10, and the hologram recording medium HM shown in FIG. 1 are extracted and shown in FIG. 8 and FIGS. 9A and 9B as diagrams of assistance in explaining a polarization direction controlling method as the second example of the first embodiment.

As with FIG. 6, FIG. 8 shows the respective light beams of the signal light and the reference light and the polarized states of the respective light beams as a diagram of assistance in explaining the recording time.

As with FIGS. 7A and 7B, FIGS. 9A and 9B are diagrams of assistance in explaining the reproduction time. FIG. 9A shows the light beam of the reference light in the forward path and the polarized state of the light beam. FIG. 9B shows the light beams of the reference light (reflected reference light) and reproduced light in the backward path and the polarized states of the light beams.

The method of the second example corresponds to a case of using a reflection type circular polarization film L3-L having an opposite property from that of the reflection type circular polarization film L3 used in the foregoing first example as a reflection type circular polarization film in the hologram recording medium HM.

Specifically, for example, the winding direction of helical structure of a cholesteric liquid crystal as the reflection type circular polarization film L3-L is opposite (right-handed) from the cholesteric liquid crystal in the foregoing first example. The reflection type circular polarization film L3-L is thus configured to transmit circularly polarized light in the left-handed direction, reflect circularly polarized light in the right-handed direction, and output circularly polarized light in a same rotation direction as incident circularly polarized light as reflected light.

To correspond to the hologram recording medium HM having such a reflection type circular polarization film L3-L formed therein, at the time of recording in this case, as shown in FIG. 8, the driving signal is turned on for both the signal light controlling region Am-s and the reference light controlling region Am-r of the selective polarization direction controlling element 15 so that the polarization directions of the incident reference light and the incident signal light are changed by 90°.

Thereby, the signal light and the reference light that entered the selective polarization direction controlling element 15 as p-polarized light are both changed to s-polarized light by the selective polarization direction controlling element 15. Thereby the signal light and the reference light output from the quarter-wave plate 9 are both circularly polarized light in the left-handed direction in this case.

As described above, the reflection type circular polarization film L3-L in this case is configured to transmit circularly polarized light in the left-handed direction and reflect circularly polarized light in the right-handed direction. Thus, as a result of the control of the selective polarization direction controlling element 15 at the time of recording as described above, the signal light and the reference light are both transmitted by the reflection type circular polarization film L3-L as shown in FIG. 8. That is, also in this case, the recording of only one kind of transmission type hologram of signal light (forward path)×reference light (forward path) can be performed, and consequently the recording of reflection type holograms can be prevented.

At the time of reproduction in this case, as shown in FIGS. 9A and 9B, the driving signal of the signal light controlling region Am-s in the selective polarization direction controlling element 15 remains turned on, and the driving signal of only the reference light controlling region Am-r is turned off. That is, at the time of reproduction in this case, the polarization direction is changed by 90° in only the signal light controlling region Am-s.

According to this, first, in the forward path of FIG. 9A, the reference light entering the quarter-wave plate 9 via the selective polarization direction controlling element 15 is retained as it is as p-polarized light, and the hologram recording medium HM is accordingly irradiated with the reference light as circularly polarized light in the right-handed direction. Thus, also in this case, the reference light can be reflected from the reflection type circular polarization film L3-L, and reproduced light obtained by the irradiation with the reference light can also be reflected from the reflection type circular polarization film L3-L. As a result, as shown in FIG. 9B, the reflected reference light and the reproduced light can be obtained as light in the backward path.

Also in this case, the reflection type circular polarization film L3-L makes the circular polarization rotation directions of incident circularly polarized light and reflected circularly polarized light the same direction. Therefore, the circular polarization rotation directions of the reflected reference light and the reproduced light obtained as reflected light from the reflection type circular polarization film L3-L as described above are the right-handed direction, which is the same as that of the incident reference light as circularly polarized light in the right-handed direction.

The reflected reference light and the signal light thus obtained as circularly polarized light in the right-handed direction are passed through the objective lens 10, then converted into p-polarized light by being passed through the quarter-wave plate 9, and enter the selective polarization direction controlling element 15.

As also described above, in the selective polarization direction controlling element 15 in this case, the signal light controlling region Am-s is on, and the reference light controlling region Am-r is off. Thus, the reproduced light entering the selective polarization direction controlling element 15 as p-polarized light as described above is converted into s-polarized light by being passed through the selective polarization direction controlling element 15. The reproduced light is consequently reflected by the polarization beam splitter 5. That is, also in this case, the reproduced light can be properly guided to the image sensor 11 side.

The reflected reference light that entered the selective polarization direction controlling element 15 as p-polarized light enters the polarization beam splitter 5 as it is as p-polarized light. The reflected reference light is consequently transmitted by the polarization beam splitter 5, and can thus be prevented from being guided to the image sensor 11 side.

Thus the method of the second example can provide similar effects to those of the first example in the case where the reflection type circular polarization film formed in the hologram recording medium HM has an opposite characteristic from that in the first example.

Summary of First Embodiment

As is understood from the above description, according to the polarization direction controlling method of the first embodiment, only one kind of transmission type hologram is recorded on the hologram recording medium HM, and thereby the recording of reflection type holograms can be prevented. In addition, at the time of reproduction, the reproduced light can be properly guided to the image sensor 11.

Further, at the time of reproduction, the reflected reference light can be prevented from being guided to the image sensor 11 side. Thereby reproduction characteristics can be improved.

When the recording of reflection type holograms can be prevented, a decrease in intensity of the reproduced light at a time of occurrence of a phase shift as described above can be prevented. It is consequently possible to improve the SNR (S/N ratio), improve the stability of reproducing operation, and further improve the recording density of the hologram.

In addition, the present embodiment employs a method that uses a reflection type circular polarization film as the reflective film of a hologram and which prevents the recording of reflection type holograms by controlling the rotation direction of circularly polarized light with which the reflection type circular polarization film is irradiated. Thus, even when recording and reproduction is performed while the hologram recording medium HM is rotation-driven, the recording of reflection type holograms can be properly prevented.

Second Embodiment

[Polarization Direction Controlling Method as First Example]

A second embodiment records only two kinds of transmission type holograms by reflecting reference light and signal light without transmitting the reference light and the signal light at the time of recording, and thus prevents the recording of reflection type holograms.

Incidentally, the internal configuration of a recording and reproducing device and the sectional structure of a hologram recording medium HM in the second embodiment are similar to those described in the first embodiment, and thus repeated description thereof will be omitted.

As in FIG. 6 and FIGS. 7A and 7B, only the polarization beam splitter 5, the selective polarization direction controlling element 15, the quarter-wave plate 9, the objective lens 10, and the hologram recording medium HM shown in FIG. 1 are extracted and shown in FIGS. 10A and 10B and FIGS. 11A and 11B as diagrams of assistance in explaining a polarization direction controlling method as a first example of the second embodiment.

FIGS. 10A and 10B are diagrams of assistance in explaining a recording time. As with FIG. 6 and FIGS. 7A and 7B, FIG. 10A shows the respective light beams of the signal light and the reference light in a forward path and the polarized states of the respective light beams, and FIG. 10B shows the respective light beams of the signal light and the reference light in a backward path and the polarized states of the respective light beams.

FIGS. 11A and 11B are diagrams of assistance in explaining a reproduction time. As with FIG. 6 and FIGS. 7A and 7B, FIG. 11A shows the light beam of the reference light in the forward path and the polarized state of the light beam, and FIG. 11B shows the respective light beams of the reference light (reflected reference light) and reproduced light in the backward path and the polarized states of the light beams.

The method of the first example corresponds to a case where a reflection type circular polarization film L3-L is formed in the hologram recording medium HM. That is, the method of the first example corresponds to a case where circularly polarized light in the left-handed direction is transmitted and circularly polarized light in the right-handed direction is reflected.

In the method of the first example, at the time of recording, as shown in FIGS. 10A and 10B, the driving signal is turned off for both of the signal light controlling region Am-s and the reference light controlling region Am-r of the selective polarization direction controlling element 15, and thereby the polarization directions of the incident reference light and the incident signal light are unchanged.

Thereby, the signal light and the reference light that entered the selective polarization direction controlling element 15 as p-polarized light are both converted into circularly polarized light in the right-handed direction by the quarter-wave plate 9. Thus, at the time of recording in this case, as represented as a transition from FIG. 10A to FIG. 10B, the reference light and the signal light are both reflected by the reflection type circular polarization film L3-L.

As also described above in the first embodiment, the reflection type circular polarization film L3-L makes the rotation direction of incident circularly polarized light and the rotation direction of reflected circularly polarized light identical to each other. According to this, on the hologram recording medium HM in this case, the circular polarization directions of the signal light and the reference light in opposed relation to each other as signal light (forward path)×reference light (backward path) and signal light (backward path)×reference light (forward path) are the same and coincide with each other, and therefore interference between these pieces of light opposed to each other does not occur. Consequently, the reflection type hologram (pattern B) of signal light (forward path)×reference light (backward path) and the reflection type hologram (pattern C) of signal light (backward path)×reference light (forward path) are prevented from being recorded.

Thus, according to the polarization direction controlling method at the time of recording as described above with reference to FIGS. 10A and 10B, the recording of reflection type holograms is prevented, and only two kinds of transmission type holograms of pattern A and pattern D are recorded in a recording layer L2 in this case.

At the time of reproduction in this case, as shown in FIGS. 11A and 11B, the driving signal of the reference light controlling region Am-r in the selective polarization direction controlling element 15 remains turned off, and the driving signal of only the signal light controlling region Am-s is turned on, so that the polarization direction is changed by 90° in only the signal light controlling region Am-s.

Such a polarization direction controlling method at the time of reproduction is similar to the polarization direction controlling method at the time of reproduction in the second example of the foregoing first embodiment represented in FIGS. 9A and 9B.

That is, also in this case, at the time of reproduction, driving control on the selective polarization direction controlling element 15 is performed such that the polarization direction is changed by 90° in only the signal light controlling region Am-s as described above. Thereby, on similar principles to those described in the second example of the foregoing first embodiment, reproduced light can be properly guided to the image sensor 11, and at the same time, reflected reference light is not guided to the image sensor 11 side. Thus reproduction characteristics can be improved.

[Polarization Direction Controlling Method as Second Example]

As in FIG. 6 and FIGS. 7A and 7B, only the polarization beam splitter 5, the selective polarization direction controlling element 15, the quarter-wave plate 9, the objective lens 10, and the hologram recording medium HM shown in FIG. 1 are extracted and shown in FIGS. 12A and 12B and FIGS. 13A and 13B as diagrams of assistance in explaining a polarization direction controlling method as a second example of the second embodiment.

FIGS. 12A and 12B are diagrams of assistance in explaining a recording time. As with FIG. 6 and FIGS. 7A and 7B, FIG. 12A shows the respective light beams of the signal light and the reference light in the forward path and the polarized states of the respective light beams, and FIG. 12B shows the respective light beams of the signal light and the reference light in the backward path and the polarized states of the respective light beams.

FIGS. 13A and 13B are diagrams of assistance in explaining a reproduction time. As with FIG. 6 and FIGS. 7A and 7B, FIG. 13A shows the light beam of the reference light in the forward path and the polarized state of the light beam, and FIG. 13B shows the respective light beams of the reference light (reflected reference light) and reproduced light in the backward path and the polarized states of the light beams.

The method of the second example of the second embodiment corresponds to a case where a reflection type circular polarization film L3 is formed in the hologram recording medium HM, that is, a case where circularly polarized light in the right-handed direction is transmitted and circularly polarized light in the left-handed direction is reflected.

In the second example, at the time of recording, as shown in FIGS. 12A and 12B, the driving signal is turned on for both of the signal light controlling region Am-s and the reference light controlling region Am-r of the selective polarization direction controlling element 15, and thereby the polarization directions of the incident reference light and the incident signal light are both changed by 90°.

Thus, the signal light and the reference light that entered the selective polarization direction controlling element 15 as p-polarized light both enter the quarter-wave plate 9 as s-polarized light, and the hologram recording medium HM is accordingly irradiated with the signal light and the reference light as circularly polarized light in the left-handed direction.

Thus, at the time of recording in this case, as represented as a transition from FIG. 12A to FIG. 12B, the reference light and the signal light are both reflected by the reflection type circular polarization film L3. The reflection type circular polarization film L3 also has the property of making the rotation direction of incident circularly polarized light and the rotation direction of reflected circularly polarized light identical to each other. Therefore, also in this case, the circular polarization directions of the signal light and the reference light in opposed relation to each other as signal light (forward path)×reference light (backward path) and signal light (backward path)×reference light (forward path) are the same and coincide with each other, and thus interference between these pieces of light does not occur. Consequently, also in this case, the reflection type hologram (pattern B) of signal light (forward path)×reference light (backward path) and the reflection type hologram (pattern C) of signal light (backward path)× reference light (forward path) can be prevented from being recorded. That is, also in this case, it is possible to record only two kinds of transmission type holograms of pattern A and pattern D in the recording layer L2.

In the second example, at the time of reproduction, as shown in FIGS. 13A and 13B, the driving signal of the reference light controlling region Am-r in the selective polarization direction controlling element 15 remains turned on, and the driving signal of only the signal light controlling region Am-s is turned off, so that the polarization direction is changed by 90° in only the reference light controlling region Am-r.

Such a polarization direction controlling method at the time of reproduction is similar to the polarization direction controlling method at the time of reproduction in the first example of the foregoing first embodiment represented in FIGS. 7A and 7B.

That is, also in this case, at the time of reproduction, driving control on the selective polarization direction controlling element 15 is performed such that the polarization direction is changed by 90° in only the reference light controlling region Am-r as described above. Thereby, on similar principles to those described in the first example of the foregoing first embodiment, reproduced light can be properly guided to the image sensor 11, and at the same time, reflected reference light is not guided to the image sensor 11 side. Thus reproduction characteristics can be improved.

Summary of Second Embodiment

As described above, according to the method of the second embodiment, it is possible to record only two kinds of transmission type holograms of pattern A and pattern D on the hologram recording medium HM, and consequently prevent the recording of reflection type holograms.

Figure 22A:
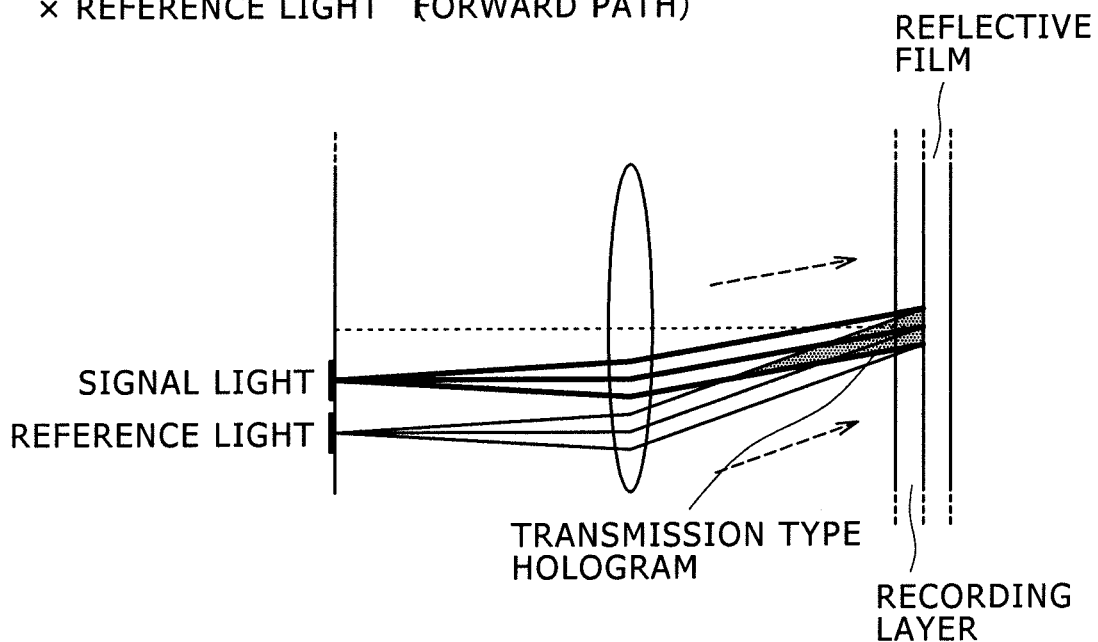
FIGS. 22A and 22B and FIGS. 23A and 23B are diagrams showing hologram patterns that can occur at a time of recording onto a reflection type hologram recording medium.
Figure 22B:
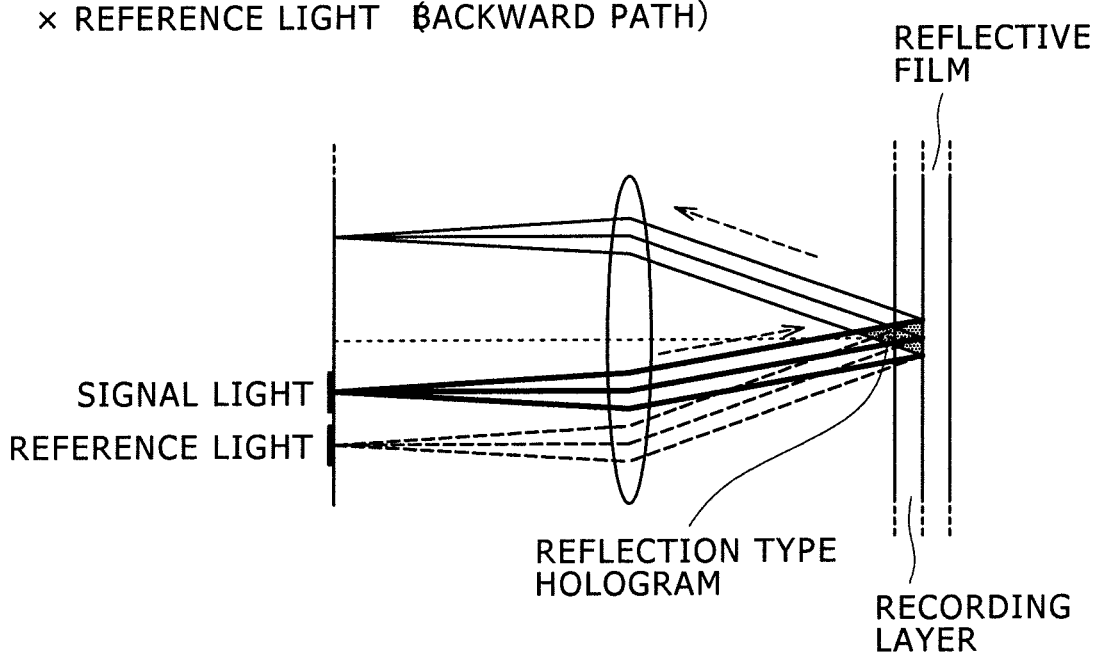
Figure 23A:
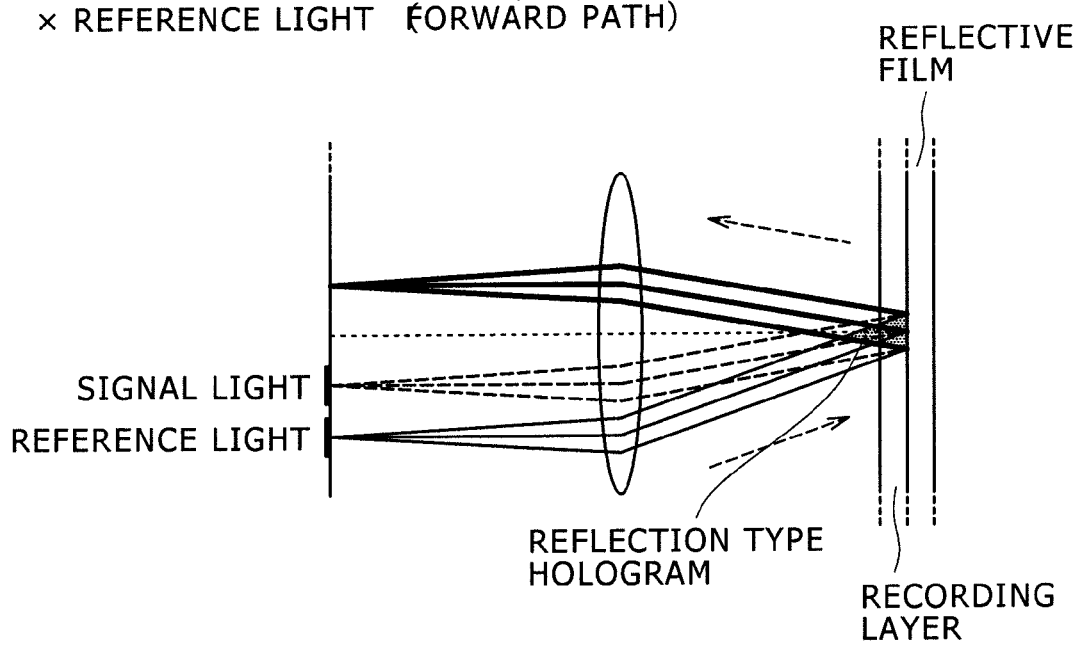
Figure 23B:
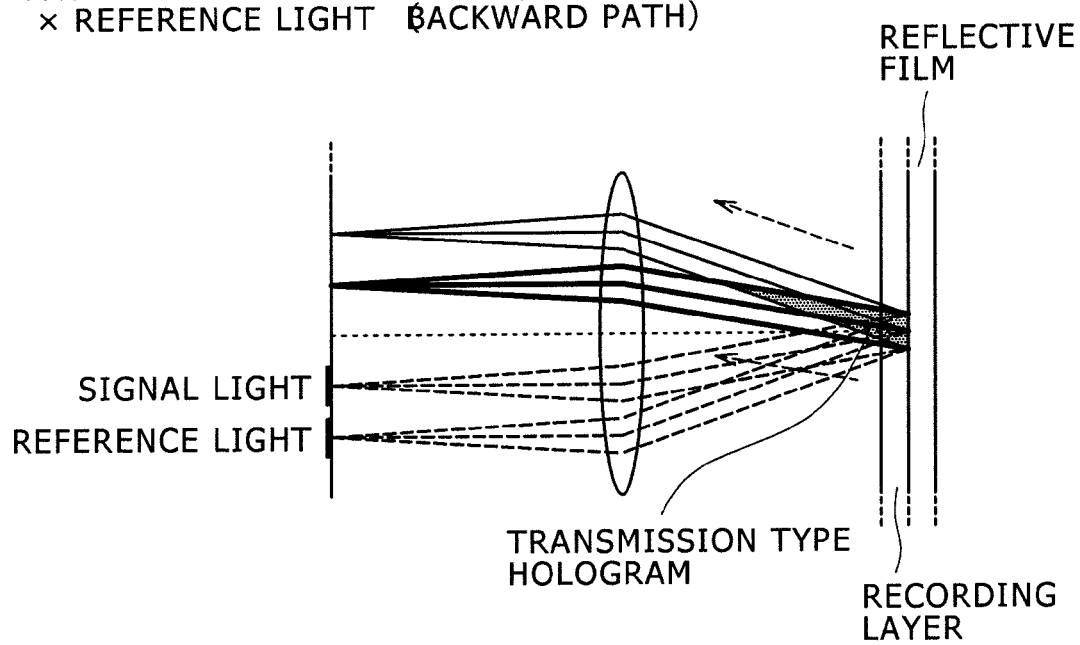

Thus recording the two kinds of transmission type holograms of pattern A and pattern D can be considered to be the recording of a hologram of double thickness, as is understood by reference to FIG. 22A and FIG. 23B. This means that the effective thickness of the medium is increased twofold as compared with the first embodiment.

In addition, as is understood from the fact that the two kinds of transmission type holograms are thus recorded, when the method of the second embodiment is employed, exposure energy for the medium can be doubled as compared with the case of employing the method of the first embodiment. Thus, the effective sensitivity of the medium can be improved more than in the case of employing the method of the first embodiment.

Examples of Modification

While embodiments of the present invention have been described, the present invention is not to be limited to the concrete examples described thus far.

For example, the configuration of the optical system described thus far is a mere example, and the present invention is not to be limited to this.

Combinations of the polarization direction of linearly polarized light entering the polarization beam splitter 5 for extracting reproduced light to be guided to the image sensor 11 side, the pattern of driving control at the time of recording/reproduction on the signal light controlling region Am-s or the reference light controlling region Am-r of the selective polarization direction controlling element 15, the reflection type circular polarization film (L3 or L3-L) formed in the hologram recording medium HM, and the like are not limited to the examples shown thus far, and various combinations are conceivable.

However, with any combination of these, the recording of reflection type holograms can be prevented and reproduced light can be properly guided to the image sensor side at the time of reproduction by performing polarization direction control at the time of recording and at the time of reproduction so as to satisfy conditions presented in the following.

First, when a method of transmitting signal light and reference light at the time of recording is employed as in the first embodiment, it suffices to satisfy the following conditions.

1) Making the polarization direction of the reference light at the time of recording orthogonal to the polarization direction of the reference light at the time of reproduction 2) At the time of recording, making the polarization directions of the reference light and the signal light identical with each other 3) At the time of reproduction, making the polarization directions of the reference light and the reproduced light (light in the light beam region of the signal light) orthogonal to each other A reason for the above 1) is that the reference light needs to be transmitted by the reflection type circular polarization film at the time of recording and the reference light needs to be reflected from the reflection type circular polarization film to obtain reproduced light at the time of reproduction.

A reason for the above 2) is that both the signal light and the reference light need to be transmitted by the reflection type circular polarization film in order to record only one transmission type hologram.

A reason for the above 3) is as follows.

First, as a premise in describing the reason for the above 3), the reflection type circular polarization film in the present invention has the property of outputting circularly polarized light in the same rotation direction as incident circularly polarized light, as described above. From this property, the polarization directions of light incident on the quarter-wave plate 9 in the forward path and light emitted from the quarter-wave plate 9 in the backward path are made identical with each other (see FIGS. 6 to 13B). That is, the polarization directions of the forward path light and the backward path light between the quarter-wave plate 9 and the selective polarization direction controlling element 15 are identical with each other. In addition, from this regard, the polarization directions of the forward path light and the backward path light between the polarization beam splitter 5 and the selective polarization direction controlling element 15 are also identical with each other.

Based on this premise, consideration will first be given to a case where the polarization direction of the reference light is unchanged at the time of recording and is change by 90° at the time of reproduction as a pattern of control of the selective polarization direction controlling element 15. First, of course, the reference light in a polarization direction of being transmitted by the polarization beam splitter 5 enters the selective polarization direction controlling element 15 (or the reference light in a polarization direction of being reflected by the polarization beam splitter 5 in a configuration where light reflected from the polarization beam splitter 5 is guided to the selective polarization direction controlling element 15).

In the case of the above control pattern, control that changes the polarization direction of the reference light by 90° is performed at the time of reproduction. Therefore, the polarization direction of the reference light (forward path) passed through the selective polarization direction controlling element 15 is converted to the polarization direction of being reflected from the polarization beam splitter 5 (or transmitted by the polarization beam splitter 5). This reference light is converted into circularly polarized light in a predetermined rotation direction (set as an A-rotation direction) via the quarter-wave plate 9, and then reflected by the reflection type circular polarization film. At this time, according to the above-described property of the reflection type circular polarization film, the reflected light is returned as it is as circularly polarized light in the A-rotation direction. As a result, the polarization direction of the backward path reference light between the quarter-wave plate 9 and the selective polarization direction controlling element 15 remains the polarization direction of being reflected by the polarization beam splitter 5 (or transmitted by the polarization beam splitter 5). As a result of this backward path reference light further being passed through the selective polarization direction controlling element 15, the polarization direction of the backward path reference light between the selective polarization direction controlling element 15 and the polarization beam splitter 5 is converted to the polarization direction of being transmitted by the polarization beam splitter 5 (or reflected by the polarization beam splitter 5).

If the condition of the above 3) is not satisfied and the polarization directions of the reference light and the reproduced light (light in the light beam region of the signal light) are the same direction, the polarization direction of the reproduced light is also the polarization direction of being transmitted by the polarization beam splitter 5 (or reflected by the polarization beam splitter 5). Consequently the reproduced light cannot be guided to the image sensor 11 side. The condition of the above 3) is necessary from this regard.

This is also true for the case of employing the control pattern of changing the polarization direction of the reference light by 90° at the time of recording and not changing the polarization direction of the reference light at the time of reproduction. That is, in this case, the polarization direction of the reference light is unchanged at the time of reproduction. Therefore, the polarization direction of the reference light (forward path) passed through the selective polarization direction controlling element 15 remains the polarization direction of being transmitted by the polarization beam splitter 5 (or reflected by the polarization beam splitter 5). This reference light is converted into circularly polarized light in a predetermined rotation direction (set as a B-rotation direction) by being passed through the quarter-wave plate 9, and then reflected by the reflection type circular polarization film and returned as it is as circularly polarized light in the B-rotation direction. Consequently, the polarization direction of the backward path reference light between the quarter-wave plate 9 and the selective polarization direction controlling element 15 remains the polarization direction of being transmitted by the polarization beam splitter 5 (or reflected by the polarization beam splitter 5). As a result of the backward path reference light further being passed through the selective polarization direction controlling element 15, the polarization direction of the backward path reference light between the selective polarization direction controlling element 15 and the polarization beam splitter 5 also remains the polarization direction of being transmitted by the polarization beam splitter 5 (or reflected by the polarization beam splitter 5).

That is, also in this case, if the polarization directions of the reference light and the reproduced light at the time of reproduction are not orthogonal to each other, the polarization direction of the reproduced light is the polarization direction of being transmitted by the polarization beam splitter 5 (or reflected by the polarization beam splitter 5), and thus the reproduced light cannot be guided to the image sensor 11 side. Consequently, also in this case, the condition 3) of making the polarization directions of the reference light and the reproduced light (light in the light beam region of the signal light) orthogonal to each other at the time of reproduction is necessary.

In addition, when the recording of reflection type holograms is prevented by reflecting the signal light and the reference light at the time of recording as in the second embodiment, the following conditions need to be satisfied.

4) Making the polarization direction of the reference light at the time of recording and the polarization direction of the reference light at the time of reproduction unchanged from each other 5) At the time of recording, making the polarization directions of the signal light and the reference light identical with each other 6) At the time of reproduction, making the polarization directions of the reference light and the reproduced light (light in the light beam region of the signal light) orthogonal to each other A reason for the above 4) is that with the method in this case, the reference light needs to be reflected from the reflection type circular polarization film both at the time of recording and at the time of reproduction.

A reason for the above 5) is that because the method in this case records two kinds of transmission type holograms, the signal light also needs to be reflected from the reflection type circular polarization film.

A reason for 6) is as follows.

First, as described above, when the reflection type circular polarization film in the above-described embodiment of the present invention is used, the polarization directions of forward path light and backward path light between the selective polarization direction controlling element 15 and the quarter-wave plate 9 are identical with each other. From this regard, the polarization directions of the forward path light and the backward path light between the polarization beam splitter 5 and the selective polarization direction controlling element 15 are also identical with each other.

In addition, as shown as the condition of the above 4), the polarization direction in the reference light area both at the time of recording and at the time of reproduction needs to be the same direction and unchanged in this case. Thus, the polarization direction of the reference light between the polarization beam splitter 5 and the selective polarization direction controlling element 15 is the same both at the time of recording and at the time of reproduction and both in the forward path and in the backward path (see FIGS. 10A to 13B).

In this case, both at the time of recording and at the time of reproduction, the reference light transmitted (or reflected) by the polarization beam splitter 5 enters the selective polarization direction controlling element 15 in the forward path. Thus, when the polarization direction of the reference light between the polarization beam splitter 5 and the selective polarization direction controlling element 15 is the same in the forward path and the backward path, the reference light in the backward path is transmitted (or reflected) by the polarization beam splitter 5 as with the reference light in the forward path. That is, the reference light is not guided to the image sensor 11 side.

In view of this, if the condition of the above 6) is not satisfied and the polarization directions of the reference light and the reproduced light are made to be the same at the time of reproduction, the polarization direction of the reproduced light is also the polarization direction of being transmitted (or reflected) by the polarization beam splitter 5 as described above. Consequently the reproduced light is not guided to the image sensor 11 side.

Thus, at the time of reproduction in this case, the condition of the above 6) of making the polarization directions of the reference light and the reproduced light (light in the light beam region of the signal light) orthogonal to each other is necessary.

Summarizing the above, in either of the cases of employing the method according to the first embodiment and employing the method according to the second embodiment, making the polarization directions of the reference light and the signal light coincide with each other as the same direction at the time of recording and making the polarization directions of the reference light and the light in the light beam region of the signal light (reproduced light) orthogonal to each other at the time of reproduction are common conditions to be satisfied.

When the polarization directions of the reference light and the signal light are made to coincide with each other at the time of recording, the signal light and the reference light at the time of recording can both be transmitted by the reflection type circular polarization film or both be reflected by the reflection type circular polarization film. Consequently the recording of reflection type holograms can be prevented.

In the case where the polarization directions of the reference light and the signal light at the time of recording are thus made to coincide with each other, the polarization directions of the reference light and the light in the light beam region of the signal light are made orthogonal to each other at the time of reproduction. Thereby, as described above, the reproduced light can be properly guided to the image sensor 11 side in either of the cases of employing the methods according to the first and second embodiments. At the same time, the reference light can be prevented from being guided to the image sensor 11 side.

As is understood from this, according to the present invention, the recording of reflection type holograms can be prevented while satisfying a necessary condition of guiding the reproduced light to the image sensor 11 side at the time of reproduction when polarization direction control is performed at least so as to make the polarization directions of the reference light and the signal light coincide with each other as the same direction at the time of recording and make the polarization directions of the reference light and the light in the light beam region of the signal light orthogonal to each other at the time of reproduction.

In addition, in the description thus far, a case of using a cholesteric liquid crystal as reflection type circular polarization film has been illustrated. However, it suffices for the reflection type circular polarization film in the embodiments of the present invention to have a property of transmitting circularly polarized light in a predetermined rotation direction, reflecting circularly polarized light in an opposite rotation direction from the predetermined rotation direction, and outputting circularly polarized light in a same rotation direction as incident circularly polarized light as reflected light. The concrete constituent material of the reflection type circular polarization film is not to be limited.

In addition, in the description thus far, an element formed so as to be capable of polarization direction control according to a driving signal for both the signal light and the reference light has been illustrated as the selective polarization direction controlling element 15. However, in the case of the method represented in FIG. 6 and FIGS. 7A and 7B, it suffices to perform polarization direction control according to the driving signal at least for only the reference light area, and it is thus clear that it suffices to set only the reference light controlling region Am-r as the selective polarization direction controlling element 15 in this case.

Similarly, in the case of the method represented in FIGS. 10A and 10B and FIGS. 11A and 11B, for example, it suffices to set only the signal light controlling region Am-s as the selective polarization direction controlling element 15.

Even in the case of employing the method of FIG. 8 and FIGS. 9A and 9B, when the signal light area of the selective polarization direction controlling element 15 is formed by a half-wave plate, for example, it is possible to set only the reference light controlling region Am-r as a region for performing polarization direction control according to the driving signal.

Similarly, also in the case of employing the method of FIGS. 12A and 12B and FIGS. 13A and 13B, when the reference light area of the selective polarization direction controlling element 15 is formed by a half-wave plate, it is possible to set only the signal light controlling region Am-s as a region for performing polarization direction control according to the driving signal.

In addition, in the description thus far, a case of using a selective polarization direction controlling element of a transmission type as the selective polarization direction controlling element 15 has been illustrated. However, a reflection type element can also be used, of course.

In addition, in the description thus far, as is illustrated as the above-described selective polarization direction controlling element 15, a case has been illustrated in which a selective polarization direction controlling section according to an embodiment of the present invention includes a liquid crystal phase difference element that performs variable phase modulation with a phase modulation amount of $\pi$ or a phase modulation amount of zero according to a driving signal. However, a selective polarization direction controlling section that performs selective polarization direction control at the time of recording/reproduction can be realized without using such a liquid crystal phase difference element.

For example, a constitution can be recited in which a partial polarization direction controlling element having a half-wave plate formed in one of regions thereof that the reference light and the signal light enter is put into and out of an optical path and thereby inserted into the optical path only at the time of recording or at the time of reproduction. That is, in this case, a retracting and inserting driving section (for example slide driving or flip-up/down driving) for putting the partial polarization direction controlling element into and out of the optical path is provided, and the controlling section 16 performs driving control by supplying the driving signal to the retracting and inserting driving section so as to obtain a state of the retracting and inserting driving section being inserted in the optical path only at the time of recording or at the time of reproduction.

Alternatively, instead of the method using such retracting and inserting driving, the above-described partial polarization direction controlling element (having a half-wave plate partially formed therein) in a state of being inserted in the optical path can be rotation-driven such that the rotation angle of the partial polarization direction controlling element is changed so as to provide an in-plane rotation angle difference of 45° between the time of recording and the time of reproduction. Thereby polarization direction control is performed only at the time of recording or at the time of reproduction. In this case, a rotation driving section configured to retain the partial polarization direction controlling element so as to be capable of rotation driving of the partial polarization direction controlling element is provided, and the controlling section 16 performs driving control by supplying the driving signal to the rotation driving section such that the partial polarization direction controlling element is rotation-driven so as to change an angle formed by the optical reference axis of the half-wave plate and the polarization direction axis of incident light between 0° and 45° at the time of recording and at the time of reproduction. Thereby 90° polarization direction control can be performed by the half-wave plate only at one of the time of recording and the time of reproduction.

In addition, in the description so far, a case has been illustrated in which the polarization direction controlling section configured to perform selective polarization direction control at the time of recording/reproduction and the linearly polarized light/circularly polarized light converting section formed by the quarter-wave plate 9, for example, are formed separately from each other. However, these sections can be formed integral with each other. In this case, it suffices to form an element capable of subjecting incident light to phase modulation according to the driving signal with two phase modulation amounts of $\pi/2$ (for quarter wavelength) and $3\pi/2$ (for three-quarter wavelength) by a liquid crystal phase difference element, for example, and insert a partial polarization converting element having the element formed in both a region thereof that the reference light enters and a region thereof that the signal light enters in place of the set of the selective polarization direction controlling element 15 and the quarter-wave plate 9.

In addition, though not particularly mentioned in the description thus far, to control a recording/reproduction position, some hologram recording and reproducing systems employ a method in which a position controlling layer having positional information recorded therein by forming a pit train, a groove and the like under the hologram reflective film is formed, and recording and reproduction position control such as tracking servo, seek operation and the like is performed using return light obtained by irradiating the position controlling layer with position controlling light of different wavelength from that of hologram recording and reproducing light.

In this case, the hologram reflective film (reflective film for reflecting reproduced light) needs to have such wavelength selectivity as to reflect the hologram recording and reproducing light and transmit the position controlling light to guide the position controlling light to the position controlling layer formed under the reflective film.

That is, to provide for such a position controlling method, a need arises for the reflection type circular polarization film (L3 or L3-L) corresponding to the hologram reflective film to have wavelength selectivity.

The cholesteric liquid crystal has a property of strongly reflecting light of a wavelength corresponding to the winding pitch of a helix of the helical structure of the cholesteric liquid crystal. Thus, to provide for the above-described position controlling method, in particular, the cholesteric liquid crystal as reflection type circular polarization film is preferably formed with such wavelength selectivity as to selectively reflect only the hologram recording and reproducing light, by making the winding pitch of the helix correspond to the wavelength of the hologram recording and reproducing light.

In addition, in the description so far, the polarization beam splitter 5 is used as an element for extracting reproduced light from the light beam region of backward path light and selectively guiding the reproduced light to the image sensor 11 side. However, a non-polarization beam splitter (half mirror) can be used in place of the polarization beam splitter 5.

In addition, in the description so far, only the method for preventing the recording of reflection type holograms in correspondence with the case of providing a reflection type circular polarization film as the reflective film of the hologram recording medium has been illustrated. However, the recording of reflection type holograms can be prevented in correspondence with a hologram recording medium HM including a reflection type linear polarization film L4 (or L5 to be described later) in place of the reflection type circular polarization film (L3 or L3-L), as shown in next FIG. 14.

The reflection type linear polarization film in this case refers to a film formed so as to selectively reflect (or transmit) incident light that is one of p-polarized light and s-polarized light. Such a reflection type linear polarization film can be realized by for example a wire grid film (metallic thin lines are arranged in a predetermined direction within a transparent film with a wire pitch of about 100 nm) or a photonic crystal.

Figure 14:
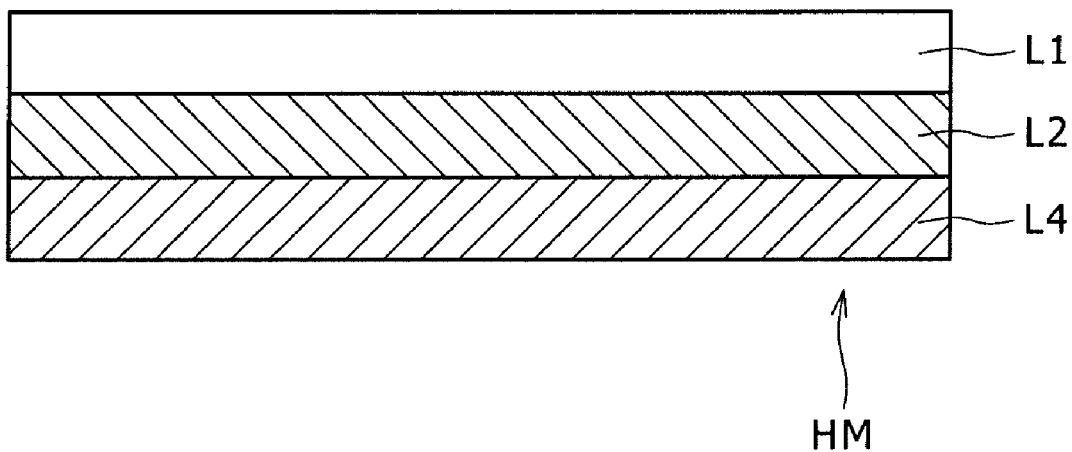
FIG. 14 is a diagram showing a sectional structure of a hologram recording medium having a reflection type linear polarization film as a reflective film.
Figure 21A:
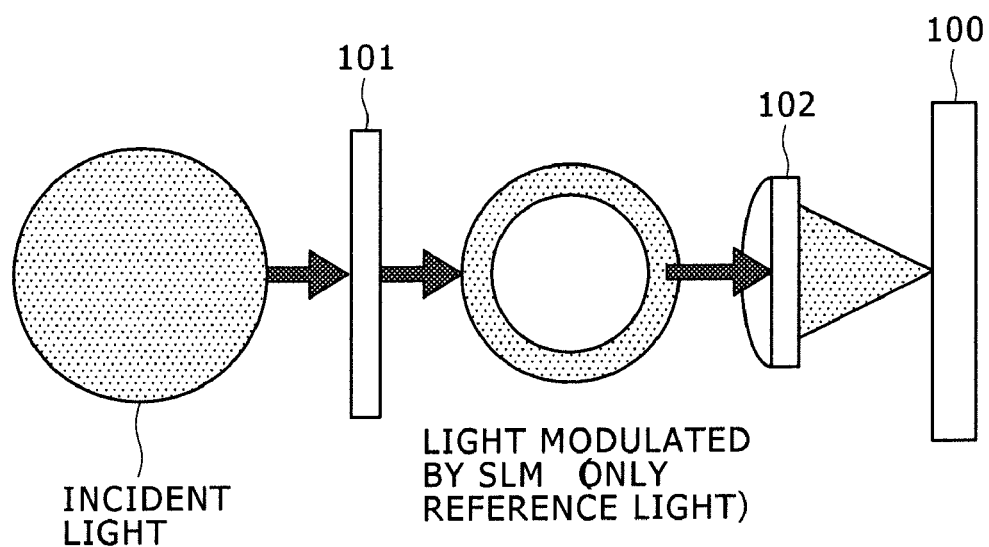
FIGS. 21A and 21B are diagrams of assistance in explaining the hologram recording and reproducing system (at the time of reproduction) based on the coaxial system.
Figure 21B:
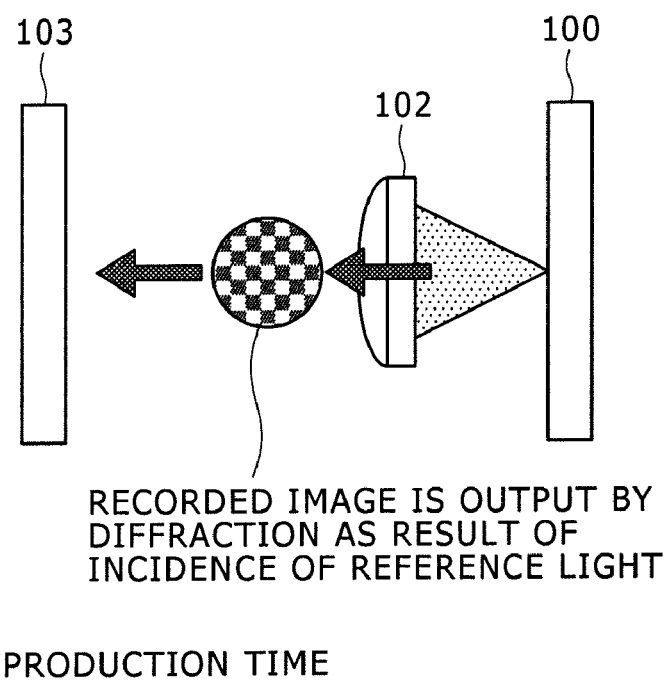

Suppose that the reflection type linear polarization film L4 shown in FIG. 14 is formed so as to have a property of transmitting p-polarized light and reflecting s-polarized light.

FIG. 15 shows an internal configuration of a recording and reproducing device as an example of modification that prevents the recording of reflection type holograms in correspondence with a hologram recording medium HM including a reflection type linear polarization film as described above as hologram reflective film.

The recording and reproducing device as an example of modification is formed by omitting the quarter-wave plate 9 from the recording and reproducing device shown in the foregoing FIG. 1.

Also in the recording and reproducing device as an example of modification, a controlling section 16 performs driving control of a selective polarization direction controlling element 15 to make the selective polarization direction controlling element 15 perform polarization direction control on incident light, whereby the recording of reflection type holograms is prevented at the time of recording, and reproduced light is guided to a image sensor 11 at the time of reproduction.

FIG. 16 and FIGS. 17A and 17B are diagrams of assistance in explaining a polarization direction controlling method corresponding to the case of providing the reflection type linear polarization film L4 (transmitting p-polarized light and reflecting s-polarized light) as shown in FIG. 14. In these figures, only a polarization beam splitter 5, the selective polarization direction controlling element 15, an objective lens 10, and the hologram recording medium HM shown in the foregoing FIG. 15 are extracted and shown. As with the foregoing FIG. 6, FIG. 16 shows the respective light beams of signal light and reference light and the polarized states of the respective light beams as a diagram of assistance in explaining the recording time. As with FIGS. 7A and 7B, FIGS. 17A and 17B are diagrams of assistance in explaining the reproduction time. FIG. 17A shows the light beam of the reference light in a forward path and the polarized state of the light beam. FIG. 17B shows the respective light beams of the reference light (reflected reference light) and reproduced light in a backward path and the polarized states of the light beams.

At the time of recording in this case, as shown in FIG. 16, a driving signal is turned off for both the signal light controlling region Am-s and the reference light controlling region Am-r of the selective polarization direction controlling element 15, and thereby the polarization directions of the incident reference light and the incident signal light are unchanged.

Thereby, the signal light and the reference light that entered the selective polarization direction controlling element 15 as p-polarized light are applied to the hologram recording medium HM as p-polarized light. The reflection type linear polarization film L4 in this case transmits p-polarized light. Thus, as a result of control of the selective polarization direction controlling element 15 at the time of recording as described above, the reference light and the signal light are both transmitted by the reflection type linear polarization film L4 as shown in FIG. 16. That is, this makes it possible to record only one kind of transmission type hologram of signal light (forward path)×reference light (forward path), and prevents the recording of reflection type holograms.

At the time of reproduction in this case, as shown in FIGS. 17A and 17B, the driving signal of the signal light controlling region Am-s in the selective polarization direction controlling element 15 remains turned off, while the driving signal is turned on for only the reference light controlling region Am-r. That is, the polarization direction is changed by 90° only in the reference light controlling region Am-r.

According to this, in the forward path of FIG. 17A, the reference light passed through the selective polarization direction controlling element 15 becomes s-polarized light, and the hologram recording medium HM is irradiated with the reference light as s-polarized light via the objective lens 10. Thus, as shown in FIG. 17B, the reference light and reproduced light obtained by the irradiation with the reference light can both be reflected from the reflection type linear polarization film L4, and the reflected reference light and the reproduced light of s-polarized light can be obtained as backward path light.

The signal light controlling region Am-s is off and the reference light controlling region Am-r is on in the selective polarization direction controlling element 15 in this case, as described above. Thus, the reproduced light of s-polarized light as described above enters the polarization beam splitter 5 as it is as s-polarized light. Consequently the reproduced light is reflected by the polarization beam splitter 5. That is, also in this case, the reproduced light can be properly guided to the image sensor 11 side.

The reflected reference light formed by the s-polarized light is passed through the selective polarization direction controlling element 15 and thereby enters the polarization beam splitter 5 as p-polarized light. Consequently, the reflected reference light is transmitted by the polarization beam splitter 5, and can thus be prevented from being guided to the image sensor 11 side.

By thus employing the polarization direction controlling method of FIG. 16 and FIGS. 17A and 17B, it is possible to prevent the recording of reflection type holograms and properly guide the reproduced light to the image sensor 11 side in correspondence with the case of providing the reflection type linear polarization film L4 in the hologram recording medium HM. At the same time, the reflected reference light is prevented from being guided to the image sensor 11 side.

The reflection type linear polarization film can also be formed so as to transmit s-polarized light and reflect p-polarized light. FIG. 18 and FIGS. 19A and 19B are diagrams of assistance in explaining a polarization direction controlling method corresponding to a case of providing a reflection type linear polarization film L5 having a property of thus transmitting s-polarized light and reflecting p-polarized light. In these figures, only the polarization beam splitter 5, the selective polarization direction controlling element 15, the objective lens 10, and the hologram recording medium HM shown in the foregoing FIG. 15 are extracted and shown. As with the foregoing FIG. 6, FIG. 18 shows the respective light beams of signal light and reference light and the polarized states of the respective light beams as a diagram of assistance in explaining the recording time.

As with FIGS. 7A and 7B, FIGS. 19A and 19B are diagrams of assistance in explaining the reproduction time. FIG. 19A shows the light beam of the reference light in a forward path and the polarized state of the light beam. FIG. 19B shows the respective light beams of the reference light (reflected reference light) and reproduced light in a backward path and the polarized states of the light beams.

At the time of recording in this case, as shown in FIG. 18, the driving signal is turned on for both the signal light controlling region Am-s and the reference light controlling region Am-r of the selective polarization direction controlling element 15, and thereby the polarization directions of the incident reference light and the incident signal light are both changed by 90°.

Thereby, the signal light and the reference light that entered the selective polarization direction controlling element 15 as p-polarized light are both applied to the hologram recording medium HM as s-polarized light via the objective lens 10. The reflection type linear polarization film L5 in this case transmits s-polarized light and reflects p-polarized light. Thus, the reference light and the signal light are both transmitted by the reflection type linear polarization film L5. Thereby, also in this case, it is possible to record only one kind of transmission type hologram of signal light (forward path)×reference light (forward path), and the recording of reflection type holograms is prevented.

At the time of reproduction in this case, as shown in FIGS. 19A and 19B, the driving signal of the signal light controlling region Am-s in the selective polarization direction controlling element 15 remains turned on, while the driving signal is turned off for only the reference light controlling region Am-r.

That is, the polarization direction is changed by 90° only in the signal light controlling region Am-s.

According to this, in the forward path of FIG. 19A, the hologram recording medium HM is irradiated with the reference light that remains p-polarized light via the selective polarization direction controlling element 15 and the objective lens 10 in this order. Thus, as shown in FIG. 19B, the reference light and reproduced light obtained by the irradiation with the reference light can both be reflected from the reflection type linear polarization film L5, and the reflected reference light and the reproduced light of p-polarized light can be obtained as backward path light.

The signal light controlling region Am-s is on and the reference light controlling region Am-r is off, as described above. Thus, the reproduced light formed by p-polarized light as described above enters the polarization beam splitter 5 as s-polarized light. Consequently, also in this case, the reproduced light is reflected by the polarization beam splitter 5, and is properly guided to the image sensor 11 side.

The reflected reference light formed by the p-polarized light enters the polarization beam splitter 5 as it is as p-polarized light. Consequently, the reflected reference light is transmitted by the polarization beam splitter 5, and can thus be prevented from being guided to the image sensor 11 side.

By thus employing the polarization direction controlling method of FIG. 18 and FIGS. 19A and 19B, it is possible to prevent the recording of reflection type holograms and properly guide the reproduced light to the image sensor 11 side in correspondence with the case of providing the reflection type linear polarization film L5 in the hologram recording medium HM. Also in this case, the reflected reference light is prevented from being guided to the image sensor 11 side.

As is understood from comparison with the foregoing FIG. 6 to FIG. 9B, changes in polarized state at respective positions in the example of modification corresponding to the reflection type linear polarization film described above are similar to those of the first embodiment, except for the omission of the quarter-wave plate 9. That is, as is also understood from this point, also in the case of employing the method of the example of modification, a goal of the present invention described above can be achieved when the following conditions are satisfied.

1) Making the polarization direction of the reference light at the time of recording orthogonal to the polarization direction of the reference light at the time of reproduction 2) At the time of recording, making the polarization directions of the reference light and the signal light identical with each other 3) At the time of reproduction, making the polarization directions of the reference light and the reproduced light (light in the light beam region of the signal light) orthogonal to each other That is, also in the example of modification, combinations of the polarization direction of linearly polarized light entering the polarization beam splitter 5, the pattern of driving control at the time of recording/reproduction on the signal light controlling region Am-s or the reference light controlling region Am-r of the selective polarization direction controlling element 15, the reflection type linear polarization film (L4 or L5) formed in the hologram recording medium HM, and the like are not limited to those illustrated above.

In addition, in the description so far, a case has been illustrated in which an intensity modulating section that performs intensity modulation for generating signal light and reference light is realized by a combination of a polarization direction control type spatial light modulator (SLM 4) and a polarization beam splitter. However, a spatial light modulator as an intensity modulator capable of performing intensity modulation singly without a need for combining a polarization beam splitter, such for example as a reflection type liquid crystal panel or a DMD (Digital Micro mirror Device: registered trademark), can also be used in place of the above combination.

In addition, a transmission type spatial light modulator (for example a transmissive type liquid crystal panel) can also be used in place of a reflection type spatial light modulator.

In addition, in the description so far, a case has been illustrated in which the reference light area A1 in a substantially annular shape is set outside the signal light area A2 in a substantially circular shape. However, the shapes of the signal light area and the reference light area are not limited to the substantially circular shape and the substantially annular shape. In addition, the reference light area may be disposed inside, and the signal light area may be disposed outside.

It suffices to set the shapes and setting positions of the signal light controlling region and the reference light controlling region in the selective polarization direction controlling section as appropriate according to the shapes and arrangement relation of the signal light area and the reference light area.

The present application contains subject matter related to that disclosed in Japanese Priority Patent Application JP 2008-264170 filed in the Japan Patent Office on Oct. 10, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A recording and reproducing device comprising:
a light source for irradiating a hologram recording medium including a recording layer in which data is recorded by interference fringes between signal light and reference light and a reflection type circular polarization film formed under said recording layer and formed so as to output circularly polarized light in a same rotation direction as incident circularly polarized light as reflected light with said signal light and said reference light;
an intensity modulating section configured to subject light output from said light source to spatial light intensity modulation in pixel units, a signal light area as a region for generating said signal light and a reference light area as a region for generating said reference light being set in the intensity modulating section;
a polarization beam splitter for receiving incident light via said intensity modulating section as forward path light and receiving incident reproduced light obtained as reflected light from said hologram recording medium as backward path light;
a selective polarization direction controlling section configured to perform selective polarization direction control for changing a polarization direction of light in at least one of a reference light beam region as a light beam region of light via said reference light area and a signal light beam region as a light beam region of light via said signal light area by 90° or not changing the polarization direction according to a driving signal at a position receiving said forward path light incident via said polarization beam splitter;
a linearly polarized light/circularly polarized light converting section configured to convert linearly polarized light obtained through said selective polarization direction control by said selective polarization direction controlling section into circularly polarized light, and convert circularly polarized light obtained as reflected light from said hologram recording medium into linearly polarized light; and
a driving controlling section configured to control said selective polarization direction controlling section so as to obtain a state of polarization directions of light in said reference light beam region and light in said signal light beam region being an identical direction at a time of recording and obtain a state of polarization directions of light in said reference light beam region and light in said signal light beam region being orthogonal to each other at a time of reproduction, as driving controlling section configured to control said selective polarization direction controlling section by supplying said driving signal.

2. The recording and reproducing device according to claim 1,
wherein said selective polarization direction controlling section is formed by a liquid crystal phase difference element formed so as to subject at least one of the light in said reference light beam region and the light in said signal light beam region to phase modulation with one of a phase modulation amount of n and a phase modulation amount of zero according to one of an on state and an off state of the driving signal.

3. The recording and reproducing device according to claim 2,
wherein said reflection type circular polarization film is formed so as to transmit circularly polarized light in a first rotation direction and reflect circularly polarized light in a second rotation direction, and
said driving controlling section performs control at the time of recording so as to make the polarization directions of the light in said reference light beam region and the light in said signal light beam region an identical polarization direction such that rotation directions of both the light in said reference light beam region and the light in said signal light beam region when both the light in said reference light beam region and the light in said signal light beam region are converted into circularly polarized light via said linearly polarized light/circularly polarized light converting section are said first rotation direction, and performs control at the time of reproduction so as to make the polarization direction of the light in said reference light beam region a polarization direction such that a rotation direction of the light in said reference light beam region when the light in said reference light beam region is converted into circularly polarized light by said linearly polarized light/circularly polarized light converting section is said second rotation direction and make the polarization direction of the light in said signal light beam region orthogonal to the polarization direction of the light in said reference light beam region.

4. The recording and reproducing device according to claim 2,
wherein said reflection type circular polarization film is formed so as to transmit circularly polarized light in a first rotation direction and reflect circularly polarized light in a second rotation direction, and
said driving controlling section performs control at the time of recording so as to make the polarization directions of the light in said reference light beam region and the light in said signal light beam region an identical polarization direction such that rotation directions of both the light in said reference light beam region and the light in said signal light beam region when both the light in said reference light beam region and the light in said signal light beam region are converted into circularly polarized light via said linearly polarized light/circularly polarized light converting section are said second rotation direction, and performs control at the time of reproduction so as to make the polarization direction of the light in said reference light beam region a polarization direction such that a rotation direction of the light in said reference light beam region when the light in said reference light beam region is converted into circularly polarized light by said linearly polarized light/circularly polarized light converting section is said second rotation direction and make the polarization direction of the light in said signal light beam region orthogonal to the polarization direction of the light in said reference light beam region.

5. The recording and reproducing device according to claim 1, wherein said selective polarization direction controlling section includes:
a partial polarization direction controlling element having a region for receiving incident light in said signal light beam region and a region for receiving incident light in said reference light beam region, one of the region for receiving incident light in said signal light beam region and the region for receiving incident light in said reference light beam region being formed by a half-wave plate; and
a retracting and inserting driving section configured to put said partial polarization direction controlling element into and out of an optical path.

6. The recording and reproducing device according to claim 1, wherein said selective polarization direction controlling section includes:
a partial polarization direction controlling element having a region for receiving incident light in said signal light beam region and a region for receiving incident light in said reference light beam region, one of the region for receiving incident light in said signal light beam region and the region for receiving incident light in said reference light beam region being formed by a half-wave plate; and
a rotation driving section configured to retain said partial polarization direction controlling element so as to be capable of rotation driving of said partial polarization direction controlling element in a state of being inserted in an optical path.

7. A polarization direction controlling method in a recording and reproducing device, said recording and reproducing device including: a light source for irradiating a hologram recording medium including a recording layer in which data is recorded by interference fringes between signal light and reference light and a reflection type circular polarization film formed under said recording layer and formed so as to output circularly polarized light in a same rotation direction as incident circularly polarized light as reflected light with said signal light and said reference light; an intensity modulating section configured to subject light output from said light source to spatial light intensity modulation in pixel units, a signal light area as a region for generating said signal light and a reference light area as a region for generating said reference light being set in the intensity modulating section; a polarization beam splitter configured to receive incident light via said intensity modulating section as forward path light and receive incident reproduced light obtained as reflected light from said hologram recording medium as backward path light; a selective polarization direction controlling section configured to perform selective polarization direction control for changing a polarization direction of light in at least one of a reference light beam region as a light beam region of light via said reference light area and a signal light beam region as a light beam region of light via said signal light area by 90° or not changing the polarization direction according to a driving signal at a position receiving said forward path light incident via said polarization beam splitter; and a linearly polarized light/circularly polarized light converting section configured to convert linearly polarized light obtained through said selective polarization direction control by said selective polarization direction controlling section into circularly polarized light, and convert circularly polarized light obtained as reflected light from said hologram recording medium into linearly polarized light, said polarization direction controlling method comprising the step of
controlling a polarization direction so as to obtain a state of polarization directions of light in said reference light beam region and light in said signal light beam region being an identical direction at a time of recording and obtain a state of polarization directions of light in said reference light beam region and light in said signal light beam region being orthogonal to each other at a time of reproduction by supplying said driving signal.

8. A recording and reproducing device comprising:
a light source for irradiating a hologram recording medium including a recording layer in which data is recorded by interference fringes between signal light and reference light and a reflection type linear polarization film formed under said recording layer and formed so as to reflect only one of p-polarized light and s-polarized light with said signal light and said reference light;
an intensity modulating section configured to subject light output from said light source to spatial light intensity modulation in pixel units, a signal light area as a region for generating said signal light and a reference light area as a region for generating said reference light being set in the intensity modulating section;
a polarization beam splitter configured to receive incident light via said intensity modulating section as forward path light and receive incident reproduced light obtained as reflected light from said hologram recording medium as backward path light;
a selective polarization direction controlling section configured to perform selective polarization direction control for changing a polarization direction of light in at least one of a reference light beam region as a light beam region of light via said reference light area and a signal light beam region as a light beam region of light via said signal light area by 90° or not changing the polarization direction according to a driving signal at a position receiving said forward path light incident via said polarization beam splitter; and
a driving controlling section configured to control said selective polarization direction controlling section so as to obtain a state of a polarization direction of light in said reference light beam region at a time of recording and a polarization direction of light in said reference light beam region at a time of reproduction being orthogonal to each other, polarization directions of the light in said reference light beam region and light in said signal light beam region at the time of recording being both an identical direction, and polarization directions of the light in said reference light beam region and light in said signal light beam region at the time of reproduction being orthogonal to each other, as driving controlling section configured to control said selective polarization direction controlling section by supplying said driving signal.

* * * * *